United States Patent [19]
Wheelock

[11] Patent Number: 5,653,955
[45] Date of Patent: *Aug. 5, 1997

[54] CYCLIC PROCESS FOR OXIDATION OF CALCIUM SULFIDE

[75] Inventor: Thomas D. Wheelock, Ames, Iowa

[73] Assignee: Iowa State University Research Foundation Inc., Ames, Iowa

[*] Notice: The term of this patent shall not extend beyond the expiration date of Pat. No. 5,433,939.

[21] Appl. No.: 468,841

[22] Filed: Jun. 6, 1995

Related U.S. Application Data

[63] Continuation-in-part of Ser. No. 209,734, Mar. 14, 1994, Pat. No. 5,433,939.

[51] Int. Cl.$^6$ ................................................. C01F 11/08
[52] U.S. Cl. ........................................ 423/638; 423/555
[58] Field of Search ................................ 423/638, 555

[56] References Cited

U.S. PATENT DOCUMENTS

| 2,740,691 | 4/1956 | Burnell | 423/638 |
|---|---|---|---|
| 4,102,989 | 7/1978 | Wheelock | 423/638 |
| 4,216,197 | 8/1980 | Moss | 423/638 |
| 4,255,162 | 3/1981 | Moss | 423/638 |
| 5,433,939 | 7/1995 | Wheelock | 423/638 |

OTHER PUBLICATIONS

Thomas D. Wheelock, U.S. application No. 08/209,734, "Cyclic Process Of Oxidation Of Calcium Sulfide", filed Mar. 14, 1994.

*Primary Examiner*—Michael Lewis
*Assistant Examiner*—Stuart L. Hendrickson
*Attorney, Agent, or Firm*—Henderson & Sturm

[57] ABSTRACT

An improved process for converting particles containing calcium sulfide into calcium oxide by subjecting the particles to repeated cycles of oxidation and reduction. The impenetrable layer of calcium sulfate which forms during the oxidation phase of each cycle is destroyed by the subsequent reducing phase. By repeating the cycle many times, the particles are converted completely into calcium oxide at a reasonable temperature of about 1000° C. The process can be carried out in either fixed bed, moving bed, or fluidized bed reactors by varying the composition of the gas supplied to the reactors in a periodic manner. Alternatively, the process can be conducted in fluidized bed reactors which have separate oxidizing and reducing zones located one above the other. In one design air is supplied through a gas distributor at the bottom of the fluidized bed to create an oxidizing zone in the lower part of the bed. A reducing gas is introduced through a second distribution grid located in the mid-region of the bed to create a reducing zone in the upper part of the bed. In another design, the zones are reversed by introducing a reducing gas through the lower gas distributor and an oxidizing gas through the upper distributor. The upper gas distributor is in the form of an open grid of tubing which does not interfere with particle circulation in the fluidized bed. As the particles circulate freely within the bed, they pass through the different zones many times to be repeatedly oxidized and reduced.

50 Claims, 13 Drawing Sheets

1st. Cycle

2nd. Cycle

3rd. Cycle

Typical results of thermogravimetric analysis

Fixed bed reactor system during Oxidation phase

Fixed bed reactor system during Reducing phase

CYCLIC PROCESS FOR OXIDATION OF CALCIUM SULFIDE

RELATED APPLICATIONS

This application is a continuation in part of Ser. No. 08/209,734, filed Mar. 14, 1994, by Thomas D. Wheelock for an invention entitled "Cyclic Process of Oxidation of Calcium Sulfide", now U. S. Pat. No. 5,433,939.

TECHNICAL FIELD

This invention relates to chemical processes, and more particularly to a process for oxidizing calcium sulfide.

BACKGROUND ART

The numbers in brackets below refer to references listed in the Appendix, the teachings of which are hereby incorporated by reference.

The U.S. Department of Energy (DOE) is sponsoring the development of several different types of integrated coal gasification, combined-cycle (IGCC) systems for generating electric power more efficiently than can be accomplished with present power generation systems [1]. An important feature of an IGCC system is the direct utilization of the hot gasifier product as a gas turbine fuel. By not cooling the gas between the gasifier and turbine, the overall thermal efficiency of the system is greater than it would be otherwise. However, the hot gas must be cleaned to remove coal ash and sulfur compounds before it is utilized as a turbine fuel. Several types of hot gas filters are being developed to remove ash. In the IGCC systems under development the hot gas will be contacted with a solid adsorbent which will remove the sulfur compounds. Although various materials can be used for adsorbing sulfur compounds at high temperature, lime is one of the more suitable materials, and it is readily available and low in cost. In some systems under development which employ fluidized bed gasifiers, lime can be supplied to the gasifiers where it reacts directly with sulfur compounds released during coal gasification. In systems which employ other types of gasifiers it is more appropriate to utilize the sorbent in a separate gas contacting device interposed between the gasifier and the gas turbine. Either fixed bed, moving bed, or fluidized bed adsorbers can be used for this purpose. The fixed bed and moving bed adsorbers would utilize sorbent particles which are considerably larger than those used in a fluidized bed adsorber.

Regardless of the gas contacting method, the reaction of lime with sulfur compounds such as hydrogen sulfide in coal gas converts the lime to calcium sulfide. Since calcium sulfide cannot be placed directly in a landfill where it would react slowly with moisture to release toxic hydrogen sulfide gas, the utilization of lime as a sorbent for sulfur compounds requires the application of a suitable process for converting calcium sulfide back to calcium oxide for either reuse or disposal.

Previous investigations have shown that the conversion of calcium sulfide to calcium oxide by oxidation with air or other oxygen-containing mixtures at high temperature is not straight-forward. When a previous attempt was made to oxidize calcium sulfide particles with a gas mixture containing 6 mol % oxygen at a temperature between 650° and 980° C., some of the calcium sulfide was converted to calcium sulfide and the reaction virtually ceased, leaving a large mount of calcium sulfide unreacted [2]. Apparently, calcium sulfate plugged the particle pores because the molar volume of calcium sulfate is 1.9 times that of calcium sulfide. Consequently, the oxidation treatment left individual particles with an unreacted core of calcium sulfide surrounded by an impenetrable shell of calcium sulfate. Other investigations [3,4] showed that the oxidation of calcium sulfide with oxygen-containing mixtures at temperatures in the range of 1000° and 1350° C. produced particles containing both calcium sulfate and calcium oxide. Only by conducting oxidation at 1450° and 1550° C. was it possible to achieve a high conversion of calcium sulfide to calcium oxide in a reasonable time [5]. Unfortunately, such temperatures are not achieved easily, and the lime would probably be dead burned and unreactive so that it could not be recycled.

To circumvent some of these difficulties, Moss [6,7] conceived a process for converting calcium sulfide into calcium oxide in which particles containing a small mount of calcium sulfide are subjected first to oxidation and then to reduction at 1050° to 1090° C. By treating the particles with an oxidizing gas, at least part of the calcium sulfide is converted to calcium sulfate, and then, when the particles are treated with a reducing gas, the calcium sulfate is converted to calcium oxide. This process is designed to regenerate lime employed in a fuel desulfurization process which involved contacting the fuel with hot lime particles in a fluidized bed reactor. The lime is converted to calcium sulfide which is then treated in an adjoining fluidized bed to regenerate the lime. The solids circulate continuously back and forth between the two fluidized beds. One of the most significant features of this process is that the conversion of calcium sulfide in each pass is low. Moss indicated that particles containing no more an 10 mol % calcium sulfide are preferred. Consequently, a large particle recirculation rate between the two fluidized beds is required to convey a given amount of sulfur from the fuel desulfurization bed to the calcium oxide regenerator. For this application it is not necessary for all or even most of the calcium sulfide to be converted to calcium oxide in any given pass through the regenerator.

The Moss process is unsuitable for treating particles with a large concentration of calcium sulfide because only a small fraction of the calcium sulfide would be converted to calcium oxide in passing through the fluidized bed regenerator described by Moss [6,7]. With his system, only an outer layer of calcium sulfide would be oxidized to calcium sulfate and subsequently reduced to calcium oxide which would leave most of the calcium sulfide intact. Therefore, the Moss process is not suitable for treating coal gasifier waste containing a high level of calcium sulfide or for regenerating a lime-based sorbent containing a large concentration of calcium sulfide. Of course, the larger the sorbent particles, the smaller the fraction of calcium sulfide converted and the poorer the performance of the process. Furthermore, the Moss process cannot be used for testing particles which are too large to be fluidized.

Those concerned with these and other problems recognize the need for an improved process for oxidizing calcium sulfide.

DISCLOSURE OF THE INVENTION

The present invention provides an improved process for converting particles containing calcium sulfide into calcium oxide by subjecting the particles to repeated cycles of oxidation and reduction. The impenetrable layer of calcium sulfate which forms during the oxidation phase of each cycle is destroyed by the subsequent reducing phase. By repeating the cycle many times, the particles are convened completely into calcium oxide at a reasonable temperature of about 1000° C. The process can be carried out in either fixed bed, moving bed, or fluidized bed reactors by varying the composition of the gas supplied to the reactors in a periodic manner. Alternatively, the process can be conducted in fluidized bed reactors which have separate oxidizing and reducing zones located one above the other. In one design air is supplied through a gas distributor at the bottom of the fluidized bed to create an oxidizing zone in the lower part of the bed. A reducing gas is introduced through a second distribution grid located in the mid-region of the bed to create a reducing zone in the upper part of the bed. In another design, the zones are reversed by introducing a reducing gas through the lower gas distributor and an oxidizing gas through the upper distributor. The upper gas distributor is in the form of an open grid of tubing which does not interfere with particle circulation in the fluidized bed. As the particles circulate freely within the bed, they pass through the different zones many times to be repeatedly oxidized and reduced.

With either method of applying the cyclic treatment, the principal reaction which takes place during oxidation is the following highly exothermic reaction:

$$CaS+2O_2=CaSO_4 \quad (1)$$

When the particles are treated subsequently by a reducing gas such as $CO$, $H_2$, or $CH_4$, the principal reaction which takes place is one of the following endothermic reactions depending on the reducing gas employed:

$$CaSO_4+CO=CaO+CO_2+SO_2 \quad (2)$$

$$CaSO_4+H_2=CaO+H_2O+SO_2 \quad (3)$$

$$CaSO_4+¼CH_4=CaO+¼CO_2+½H_2O+SO_2 \quad (4)$$

After numerous cycles of oxidation and reduction, the particles will appear to have undergone one of the overall reactions shown below again depending on which reducing gas is employed.

$$CaS+2O_2+CO=CaO+CO_2+SO_2 \quad (5)$$

$$CaS+2O_2+H_2=CaO+H_2O+SO_2 \quad (6)$$

$$CaS+2O_2+¼CH_4=CaO+¼CO_2+½H_2O=SO_2 \quad (7)$$

Thus, it can be seen that overall the conversion of one mole of calcium sulfide to calcium oxide requires two moles of oxygen and one mole of either carbon monoxide or hydrogen or 0.25 mole of methane. Other reducing gases such as ethane or propane can also be employed. It is noteworthy that reactions 5, 6, and 7 are exothermic reactions.

Methods similar to the ones described above for conducting a cyclic process in a fluidized bed reactor have been demonstrated with large bench-scale systems applied to the decomposition of calcium sulfate [8, 9, 10, 11]. Since this is an endothermic process, heat is supplied by partial combustion of a hydrocarbon fuel such as natural gas within the fluidized bed where calcium sulfate is decomposed. Partial combustion of a fuel-rich mixture of fuel and air generates carbon monoxide and hydrogen which then react with calcium sulfate mainly according to reactions 2 and 3. However, some calcium sulfate is reduced to calcium sulfide by the following reactions:

$$CaSO_4+4CO=CaS+4CO_2 \quad (8)$$

$$CaSO_4+4H_2=CaS+4H_2O \quad (9)$$

In order to eliminate the calcium sulfide produced by these reactions, the particles are treated subsequently with an oxidizing gas which results in reaction 1 and the following reaction taking place simultaneously:

$$CaS+ \! {}^3\!/\!_2 O_2=CaO+SO_2 \quad (10)$$

However, reaction 1 produces calcium sulfate which can only be decomposed by further exposure to a reducing gas. Thus, it has proved effective to employ a cyclic process in which the particles are treated alternately and repeatedly to oxidation and reduction. One method of conducting the cyclic process is to establish separate oxidizing and reducing zones within the same fluidized bed by controlling the air to fuel ratio supplied to the different zones. For example, a fuel-rich mixture of air and natural gas is supplied to the bottom of the bed creating a reducing zone in the lower part of the bed, and excess secondary air is supplied higher up in the bed creating an oxidizing zone in the upper part of the bed. A second method of conducting the cyclic process involves varying in a periodic manner the composition of the entire gas phase within the bed by controlling the overall air to fuel ratio supplied to the reactor. During one part of each cycle a fuel-rich mixture of air and natural gas is supplied to the reactor, while during another part of the cycle only air is supplied.

Although the present methods for convening calcium sulfide to calcium oxide appear similar to the methods which were demonstrated previously for converting calcium sulfate to calcium oxide, the two processes serve entirely different purposes and differ in implementation. The conversion of calcium sulfide to calcium oxide is a two-step process which has to be conducted by means of a series of short oxidation and reduction steps. Calcium sulfate is an unavoidable intermediate formed by the first step and destroyed by the second step. Since the overall conversion of calcium sulfide to calcium oxide is an exothermic process, heat has to be removed by some means such as by spraying water into the fluidized bed or by cooling the reactor walls. The overall required mounts of oxygen and reducing gas are determined by the stoichiometric requirements of reactions such as 5, 6, and 7.

The previously developed cyclic process, which is designed for converting calcium sulfate into calcium oxide, is a one-step process. The formation of calcium sulfide is incidental. Calcium sulfide is formed by a side reaction and is never present in more than small amounts. The oxidation step in the cycle serves the purpose of eliminating this undesirable by-product. Since the conversion of calcium sulfate into calcium oxide is an endothermic process, heat has to be supplied by the combustion of fuel within the fluidized bed. The fuel requirements for the reductive decomposition of calcium sulfate via reactions such as 2, 3, and 4 are relatively large both because of the heat absorbed by the reactions and the participation of reducing gases in the reactions. Previous material and energy balance calculations have shown that if methane is employed as a fuel and source of reductants, between 0.65 and 1.66 mole $CH_4$/mole $CaSO_4$ is required depending on the reaction temperature and thermal efficiency of the process [8]. The quantity of methane is much greater than the 0.25 mole $CH_4$/mole $CaS$ required for the conversion of calcium sulfide to calcium oxide by the present two-step process. Air requirements for the two processes also differ substantially. Therefore, it can be seen that the two processes require conditions which differ significantly.

BRIEF DESCRIPTIONS OF THE DRAWINGS

These and other attributes of the invention will become clearer upon a thorough study of the following description of the best mode for carrying out the invention, particularly when reviewed in conjunction with the examples and drawings wherein.

Figure 10:
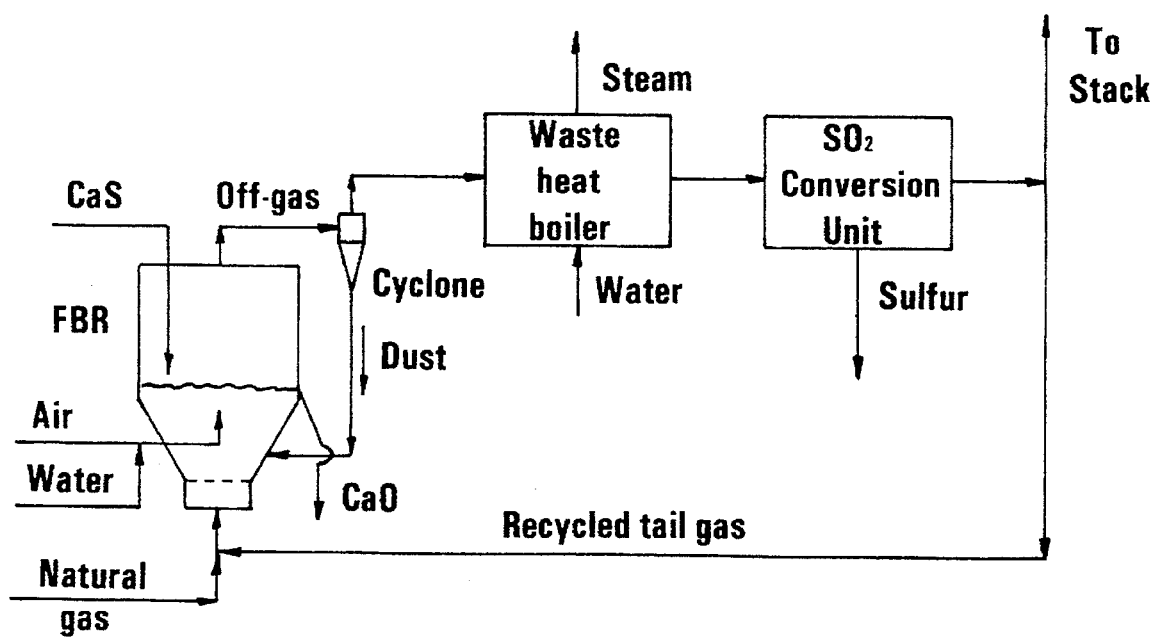

FIG. 10 is a flow sheet for an integrated process which combines a two-zone fluidized bed reactor (FBR) for converting calcium sulfide into calcium oxide and sulfur dioxide with a waste heat boiler for recovering heat from the FBR off-gas and a unit for converting sulfur dioxide in the FBR off-gas into elemental sulfur. A portion of the remaining tail gas is recycled to dilute the natural gas supplied to the FBR.

Figure 11:
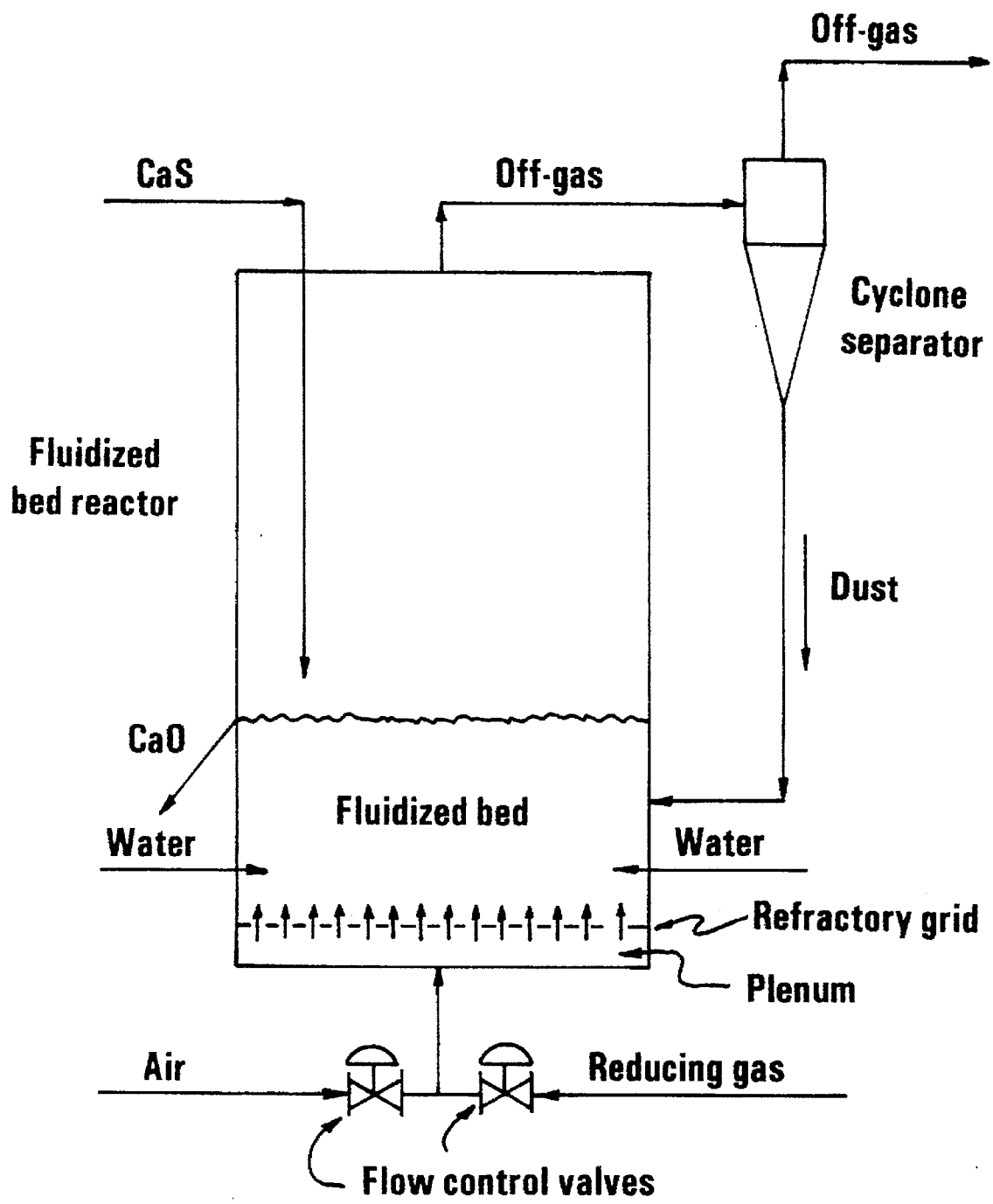

FIG. 11 is a cross-sectional elevational view of fluidized bed reactor equipped with means for continuously cycling the gas supplied to the reactor so that the gas phase present in the reactor varies between oxidizing and reducing states in a periodic manner.

Figure 12:
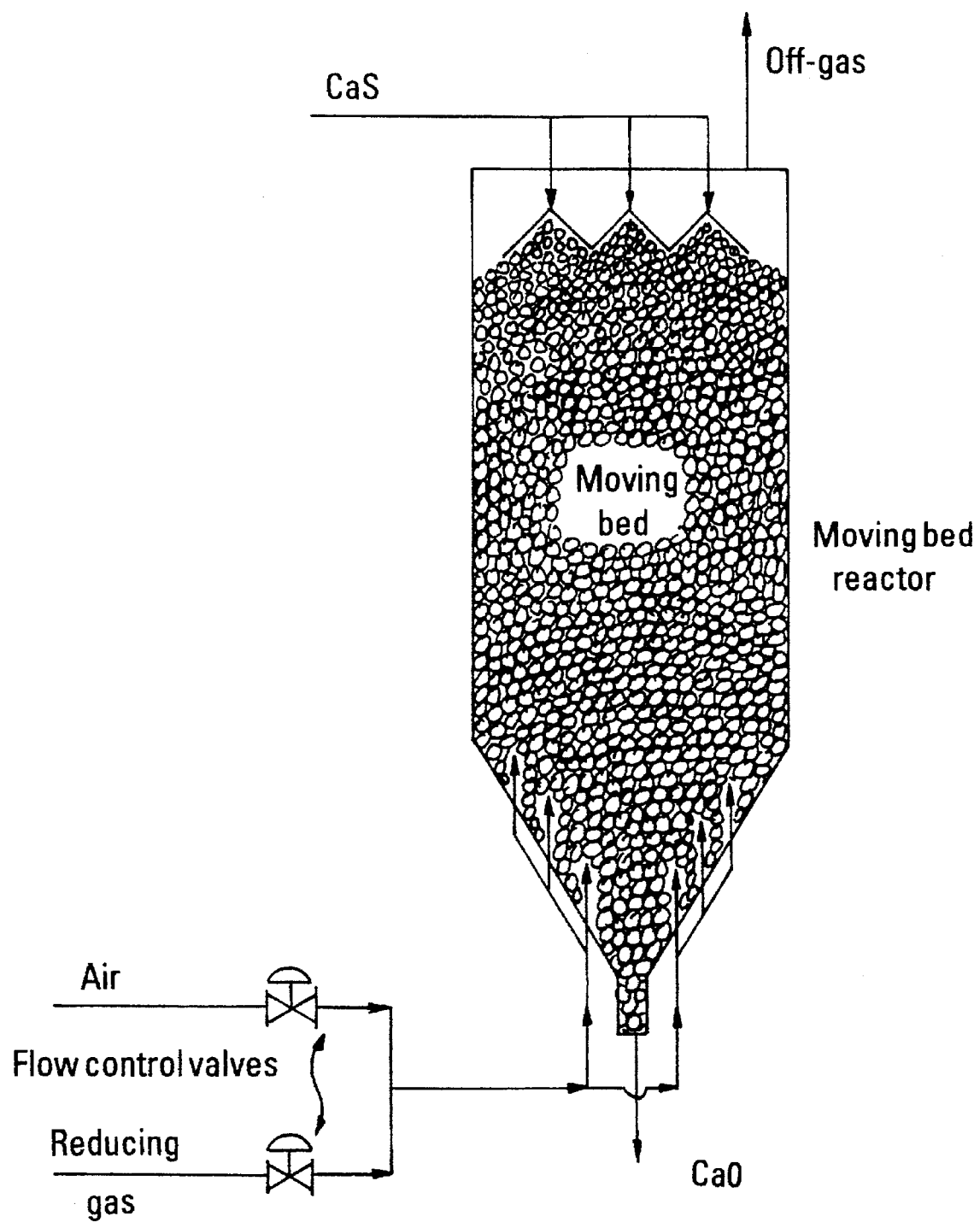

FIG. 12 is a cross-sectional elevational view of a moving bed reactor equipped with means for continuously cycling the gas supplied to the reactor.

Figure 13A:
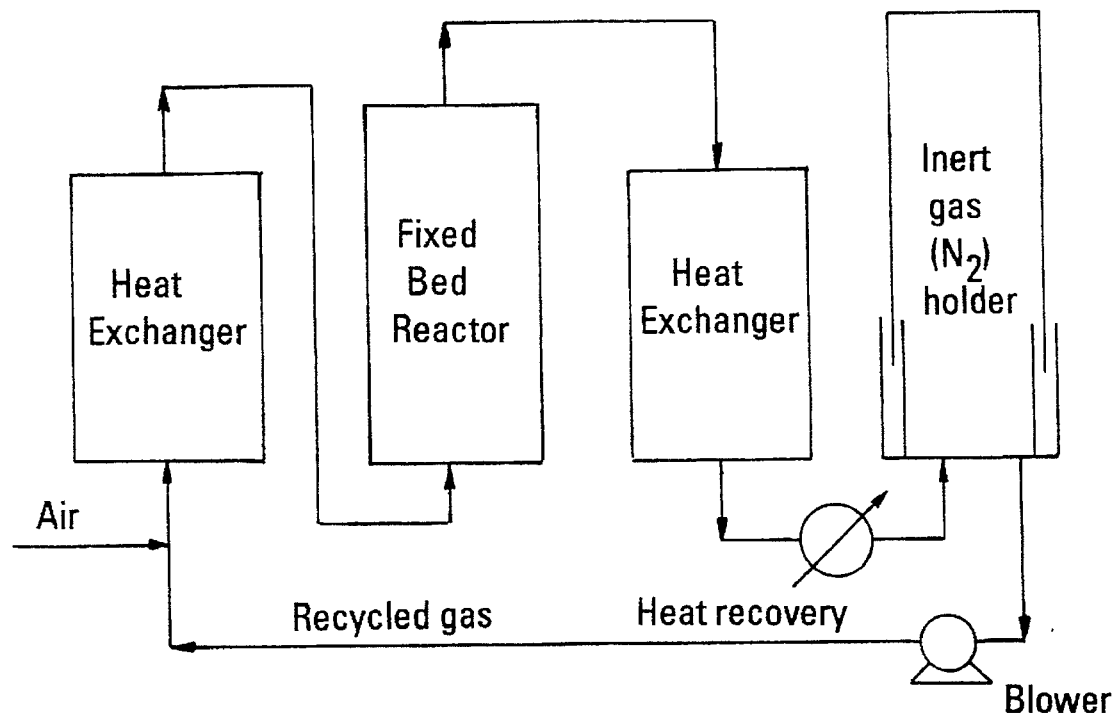
Figure 13B:
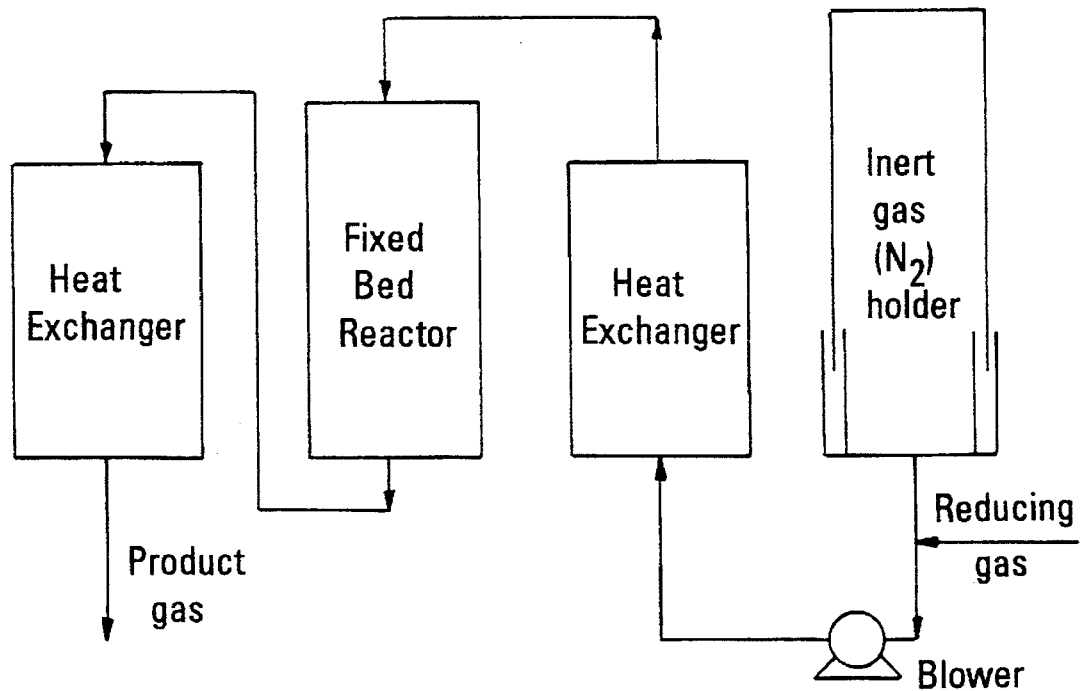

FIG. 13a is a flow sheet showing a fixed bed reactor system during the oxidation phase; and FIG. 13b is a flow sheet showing a fixed bed reactor system during the reducing phase.

BEST MODE FOR CARRYING OUT THE INVENTION

Figure 1:
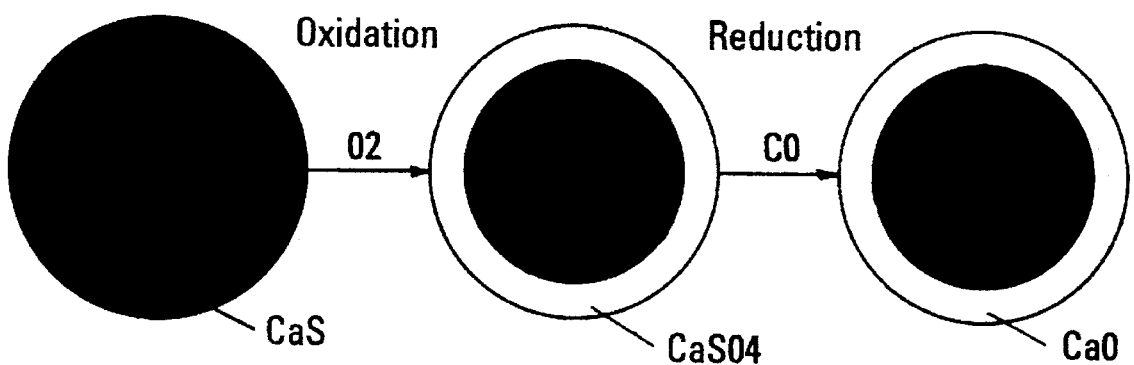
FIG. 1 is a schematic diagram of a single particle of CaS that is converted one layer at a time to $CaSO_4$ and then to CaO by alternately treating it with an oxidizing gas and then with a reducing gas.
Figure 1:
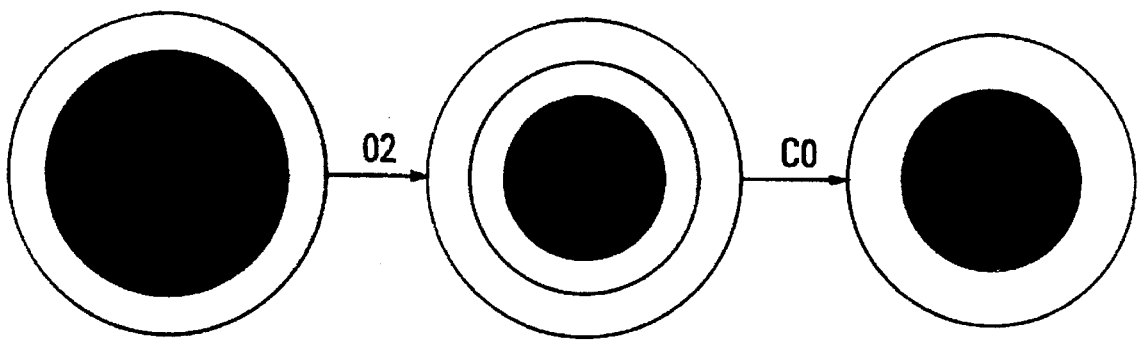
Figure 1:
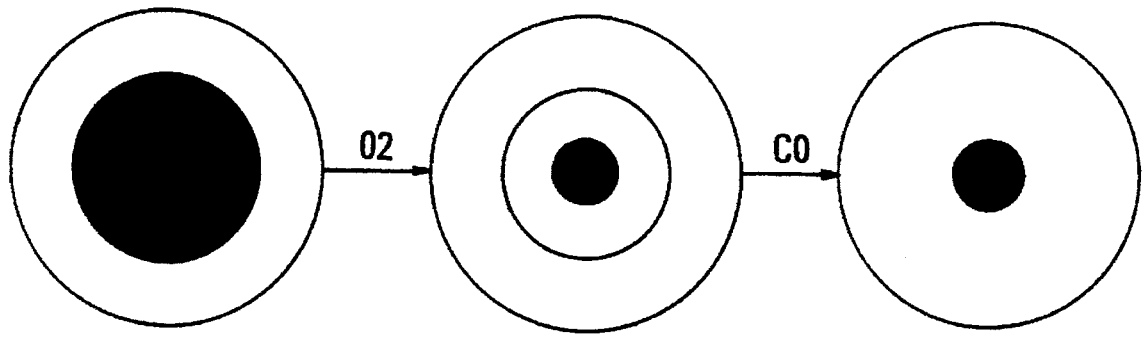

The present process described herein overcomes the shortcomings of the Moss process by subjecting particles containing calcium sulfide to repeated cycles of oxidation and reduction. The impenetrable layer of calcium sulfide which forms during the oxidation phase of each cycle is destroyed by the subsequent reducing phase. In this way each particle of calcium sulfide is converted one layer at a time to calcium sulfate and then to calcium oxide by alternately treating it with an oxidizing gas and then with a reducing gas. A schematic representation of the process applied to a single particle is indicated by FIG. 1.

In commercial applications, the process can be carried out in either fixed bed, moving bed, or fluidized bed reactors. With any of these reactors the solid particles undergoing treatment can be subjected to repeated cycles of oxidation and reduction by varying the composition of the gas supplied to the reactor in a periodic manner. During the oxidizing phase of each cycle an oxidizing gas such as air is supplied and during the reducing phase a reducing gas such as natural gas is supplied. By an appropriate selection of reactor type, it becomes possible to treat particles of various sizes containing almost any concentration of calcium sulfide and achieve nearly complete conversion of calcium sulfide to calcium oxide.

When fluidized bed reactors are employed for this process, there is an alternative method for treating particles to repeated cycles of oxidation and reduction. The method is based on maintaining separate oxidizing and reducing zones, one above the other, within the same fluidized bed. As the particles circulate freely within the bed, they are treated repeatedly to oxidation and reduction. This treatment is in marked contrast to that proposed by Moss which employs a fluidized bed with adjacent oxidizing and reducing zones but particle circulation between the zones is inhibited by a vertical baffle between the zones. The method is designed to oxidize the particles in a single step and then reduce the particles in a second single step while avoiding backmixing and a repetition of the steps.

The following examples are illustrative of the best mode for carrying out the invention. They are obviously not to be construed as limitative of the invention since various other embodiments can readily be evolved in view of the teachings provided herein.

EXAMPLE I

Methods of converting calcium sulfide to either calcium oxide or calcium sulfate using different techniques were investigated since these two products are much more suitable for direct disposal.

The oxidation of calcium sulfide was done using a Thermogravimetric Analysis apparatus (TGA).

Among the different techniques used, the most promising was a series of experiments involving the cyclic oxidation and reduction of pure calcium sulfide pellets in the TGA apparatus. A pellet was placed in a basket and put into the TGA apparatus.

The TGA apparatus consisted of a quartz reactor tube about 1 meter in length surrounded by an insulated electric furnace which could heat up to about 1200° C.

A CAHN 2000 electrobalance was used to give continuous readings of the mass of the sample during experiments. These readings were recorded on a chart recorder. The samples were placed in either a quartz basket or on a quartz pan and were hung from a loop on the electrobalance.

The gases were fed into the top of the quartz tube and also some nitrogen was fed into the electrobalance casing to stop any other gases from entering it. The gas mixture was regulated using a series of rotameters.

The temperature in the furnace was regulated manually using a thermocouple to measure reactor temperature, and it was possible to keep the temperature within 10° C. of the desired temperature.

The electrobalance was calibrated every 3 or 4 experiments or whenever the sample holder was changed or replaced.

For the oxidation phase of the cycle, 10% oxygen was used for most experiments. For the reduction phase of the cycle, either 20% natural gas or 5% carbon monoxide was used. The time for oxidation and reduction varied from one minute for each phase to a longer time where the oxidation and reduction were allowed to go to completion.

The other variable for these experiments was the temperature and this ranged from 900° to 1100° C.

Due to the fact that the exit gas stream could not be analyzed, the final composition of the sample was not known and therefore a few reacted and partially reacted samples were sent for X-ray diffraction analysis.

Figure 2:
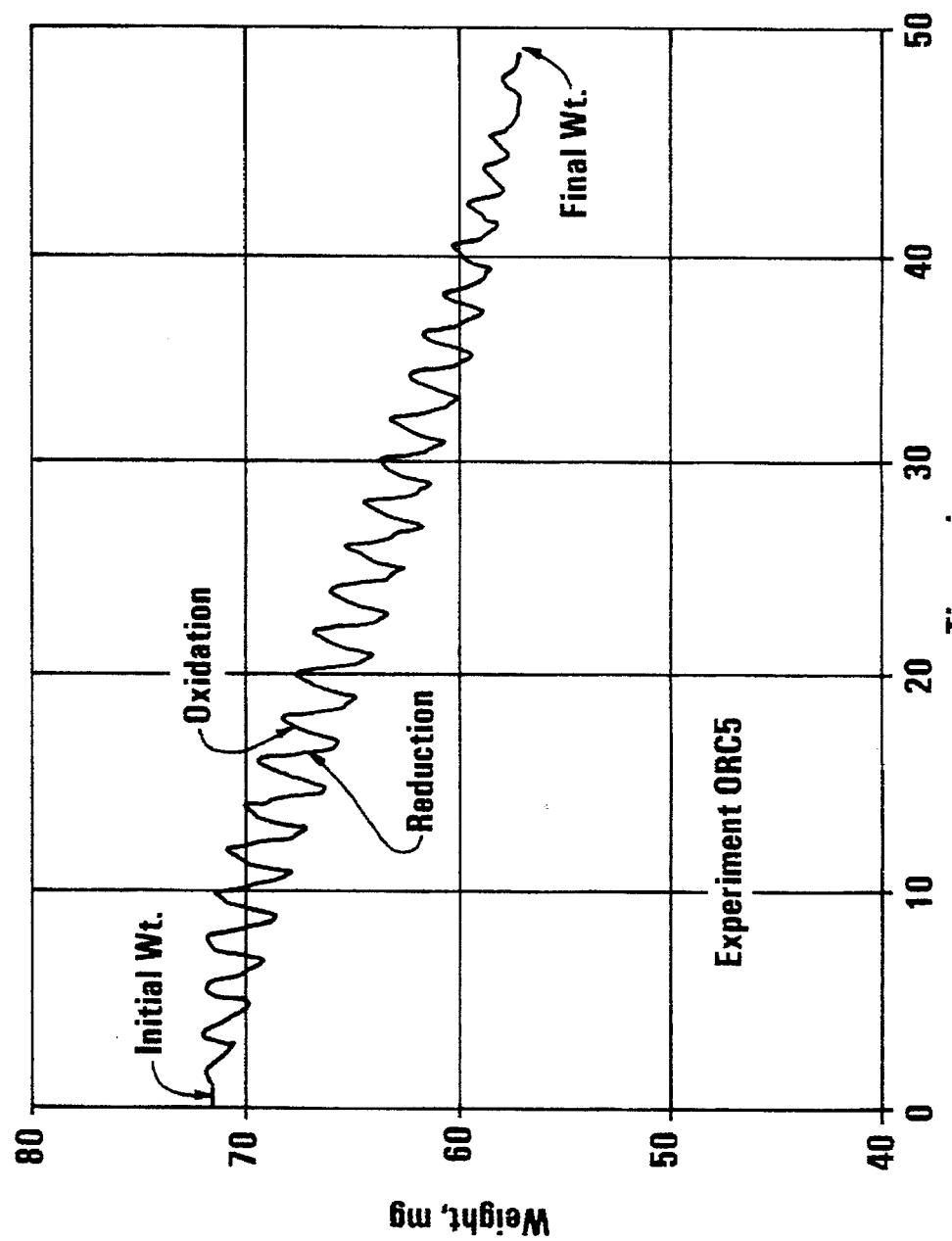
FIG. 2 is a chart from the chart recorder connected to a Thermogravimetric Analysis (TGA) apparatus showing sample weight changes which occurred during the oxidation of CaS by the cyclic process.

FIG. 2 shows a typical result achieved using this method.

The set of experimental data given in TABLE 1 shows different operating conditions and results. In these experiments the aim was to convert the sulfide to the oxide. The results show that the conversion was quicker at higher temperatures but that the conversion obtained varied fairly widely.

hydroxide and the product of experiment ORM 3 to be largely calcium oxide with a considerable amount of calcium hydroxide and a small amount of calcium sulfide.

By reference to Table 1, it can be seen that particles or pellets of calcium sulfide can be converted rapidly and almost completely to calcium oxide by a cyclic process which exposes the material alternatively to oxidation and reduction at 900° to 1100° C. In experiment number ORC 5, during the oxidation phase of the cycle, the particles were treated with a gas mixture containing 10% by volume oxygen and during the reducing phase the particles were treated with a gas containing 5% by volume carbon monoxide. By using a 2 minute cycle and a total treatment time of 44 minutes, a conversion of 97% was achieved at 1100° C. starting with a 72 mg pellet and using conventional TGA equipment. When a similar pellet of calcium sulfide was subjected to oxidation alone under similar conditions, almost no reaction took place.

The results of such experiments indicate that during the oxidation phase of the cycle the principal reaction taking place is the following:

$$CaS + 2O_2 = CaSO_4 \tag{1}$$

Since the calcium sulfate occupies a greater volume than the calcium oxide, it blocks the pores in the particle and forms an impenetrable layer. When the particle is subsequently treated with a reducing gas such as carbon monoxide, the following reaction occurs:

TABLE 1

Cyclic oxidation of CaS Pellets using 10% oxygen and 20% natural gas or 5% carbon monoxide

| EXPERIMENT No. | TEMPERATURE C | INITIAL Wt. mg. | FINAL Wt. mg. | WEIGHT LOSS mg. | TIME mins. | CONVERSION % | CYCLE RATIO Oxid. min./Red. min. |
|---|---|---|---|---|---|---|---|
| CYCLIC OXIDATION AND REDUCTION USING OXYGEN AND NATURAL GAS | | | | | | | |
| ORM1 | 1050 | 92 | 71 | 21 | 116 | 100 | 3:1 |
| ORM2 | 950 | 76 | 60 | 16 | 135 | 93 | 1:1 |
| ORM3 | 1050 | 81 | 66 | 15 | 72 | 81 | 1:1 |
| ORM4 | 1100 | 91 | 72 | 19 | 60 | 92 | 1:1 |
| ORM5 | 1050 | 67 | 54 | 13 | 76 | 87 | 1:1 |
| ORM6* | 1050 | 74 | 60 | 14 | 74 | 86 | 1:1 |
| ORM7 | 1050 | 68 | 52 | 16 | 64 | 103 | 2:1 |
| ORM8 | 1050 | 82 | 66 | 16 | 100 | 86 | 2:1 |
| ORM9 | 1100 | 70 | 57 | 13 | 40 | 81 | 1:1 |
| CYCLIC OXIDATION AND REDUCTION USING OXYGEN AND CARBON MONOXIDE | | | | | | | |
| ORC1 | 1050 | 70 | 57 | 13 | 60 | 81 | 1:1 |
| ORC2 | 1050 | 67 | 57 | 10 | 44 | 67 | 1:1 |
| ORC3 | 950 | 64 | 54 | 10 | 80 | 71 | 1:1 |
| ORC4 | 1050 | 69 | 56 | 13 | 56 | 83 | 1:1 |
| ORC5 | 1100 | 72 | 56 | 16 | 44 | 97 | 1:1 |
| ORC6 | 1050 | 70 | 57 | 13 | 78 | 81 | 2:1 |
| ORC7 | 1100 | 65 | 50 | 15 | 72 | 102 | VARIED |
| ORC8 | 1050 | 60 | 47 | 13 | 104 | 100 | 4:4 |
| ORC9 | 900 | 97 | 84 | 13 | 160 | 62 | VARIED |
| ORC10 | 950 | 56 | 49 | 7 | 220 | 58 | VARIED |
| ORC11 | 1050 | 62 | 49 | 13 | 160 | 93 | VARIED |

20% oxygen was used for experiment ORM6.

The solids recovered following experiments ORC 5 and ORM 3 in which calcium sulfide had undergone cyclic oxidation and reduction were subjected to X-ray diffraction analysis. This analysis confirmed the almost complete oxidation of calcium sulfide to calcium oxide. While the product contained a large amount of calcium hydroxide when analyzed, the calcium hydroxide was the result of exposing the material to air before it was analyzed. Consequently the calcium oxide reacted with moisture in the air to form calcium hydroxide. Therefore, the analysis showed the product of experiment ORC 5 to be essentially all calcium $$CaSO_4 + CO = CaO + CO_2 + SO_2 \tag{2}$$

These reactions can be observed by measuring the change in weight of the particle, since the first reaction produces an increase in weight, whereas the second reaction produces a decrease in weight. For each cycle there is an overall decrease in weight, and these changes become readily apparent by employing thermogravimetric analysis (TGA). Preliminary experiments indicate that a number of cycles are required to convert a particle of calcium sulfide completely to calcium oxide. The evidence suggests that the conversion of calcium sulfide into calcium oxide follows a shrinking, unreacted core process where the unreacted core of calcium sulfide gradually recedes and the surrounding shell of calcium oxide gradually becomes thicker with each cycle.

EXAMPLE II

Further experiments were conducted with the TGA apparatus described above to determine the effects of gas composition and temperature on the overall rate of conversion of calcium sulfide to calcium oxide by the cyclic oxidation and reduction process. Again single pellets of pure calcium sulfide were treated in the apparatus to oxidizing and reducing gas mixtures under carefully controlled conditions, and the progress of the reactions was observed by recording the weight of the pellet continuously. A 2 min. cycle time was employed with 1 min. devoted to oxidation and 1 min. to reduction. Temperature, oxygen concentration, and the type of reducing gas and its concentration were varied among different runs. The conversion of calcium sulfide to calcium oxide was determined throughout each run from the loss in weight of the reacting pellet. The results of this series of runs are reproduced in FIGS. 3 to 7. In each of these figures the conversion is plotted against reaction time. Therefore, the slope of the resulting curve is a measure of the overall rate of conversion.

Figure 3:
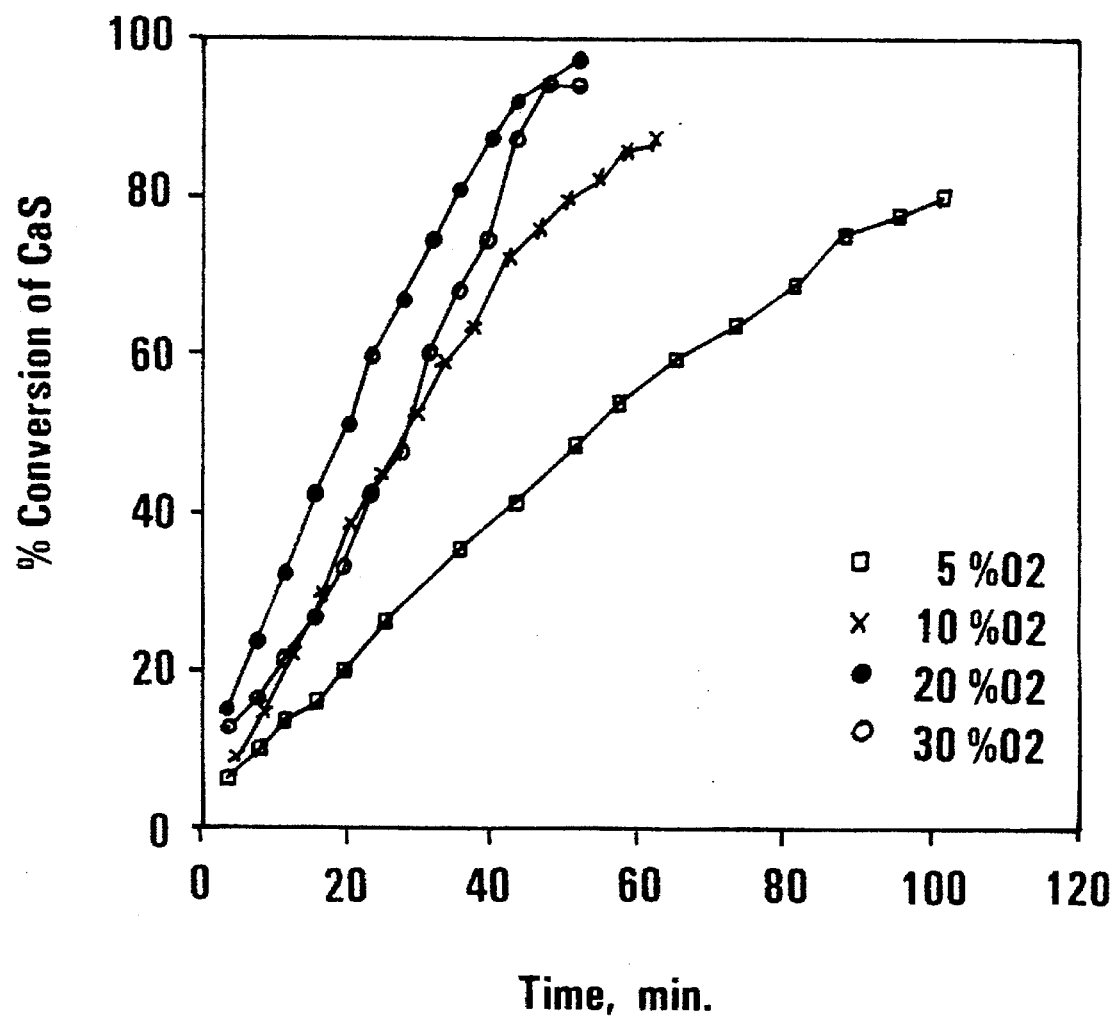
FIG. 3 is a graph of the data obtained in a series of TGA runs in which a pellet of calcium sulfide was treated by the cyclic process at 1050° C. using various oxygen concentrations and a carbon monoxide concentration of 30 mole %.

To investigate the effect of gas composition on the rate of conversion, a reaction temperature of 1050° C. was employed. FIG. 3 shows how the overall rate of conversion of calcium sulfide was affected by oxygen concentration during the oxidizing phase of each cycle. Carbon monoxide in 30 mole % concentration was the reducing gas employed during the reducing phase. It can be seen that the greatest overall rate of conversion was achieved with 20 mole % oxygen. With either higher or lower oxygen concentrations, the overall rate of conversion was lower.

Figure 4:
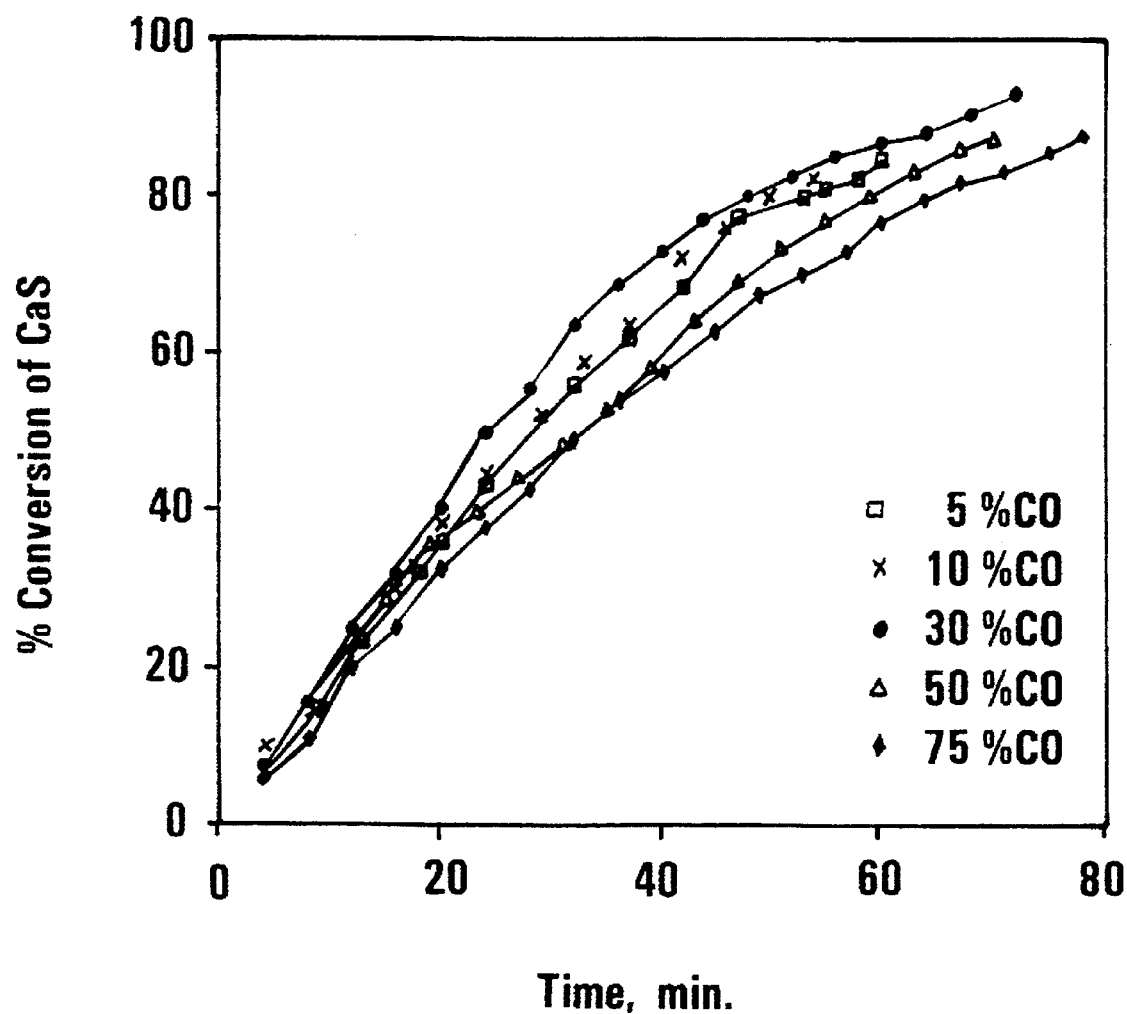
FIG. 4 is a graph of the data obtained in a series of TGA runs in which a pellet of calcium sulfide was treated by the cyclic process at 1050° C. using an oxygen concentration of 10 mole % and various carbon monoxide concentrations.
Figure 5:
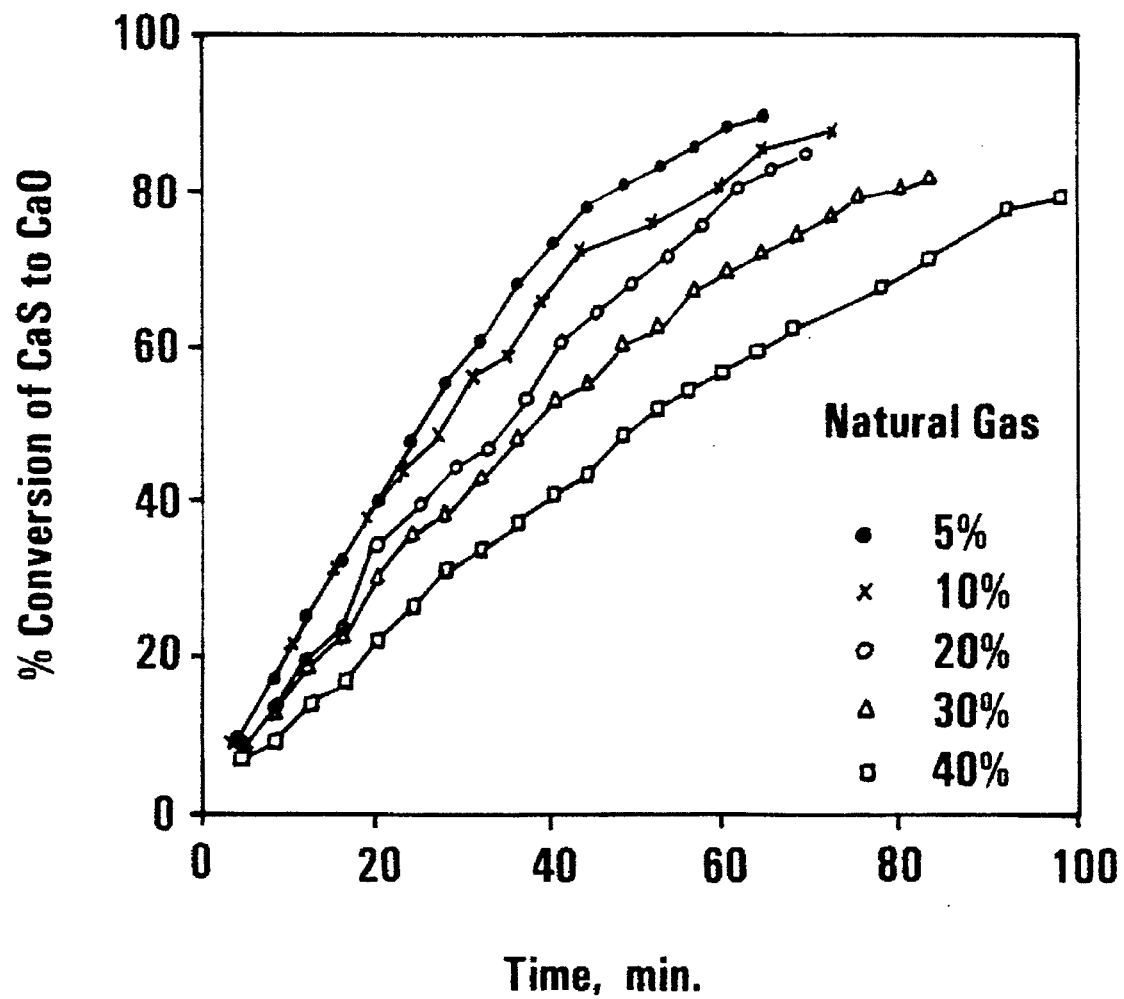
FIG. 5 is a graph of the data obtained in a series of TGA runs in which a pellet of calcium sulfide was treated by the cyclic process at 1050° C. using an oxygen concentration of 10 mole % and various concentrations of natural gas.
Figure 6:
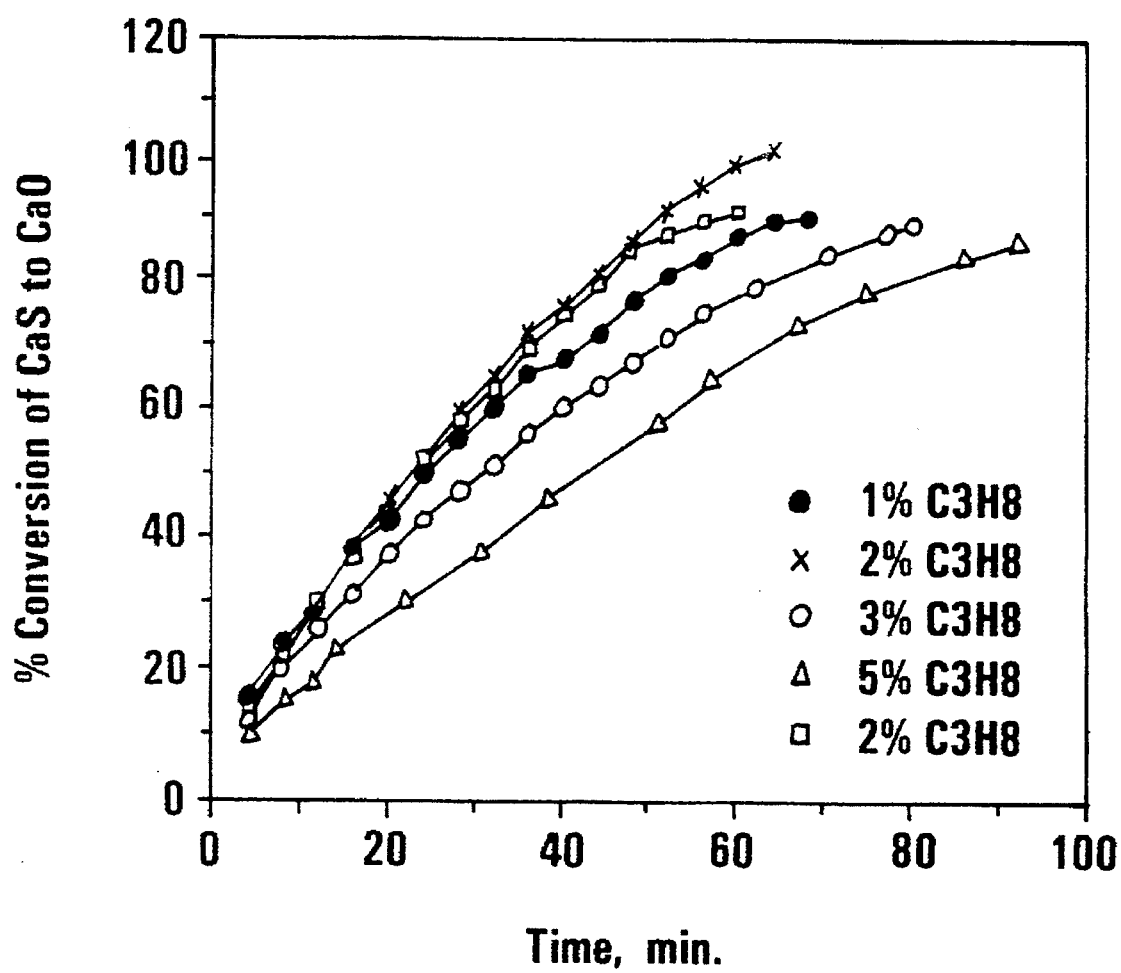
FIG. 6 is a graph of the data obtained in a series of TGA runs in which a pellet of calcium sulfide was treated by the cyclic process at 1050° C. using an oxygen concentration of 10 mole % and various concentrations of propane.

To investigate the effects of reducing gas type and concentration, an oxygen concentration of 10 mole % was employed during the oxidizing phase. The results achieved with carbon monoxide, natural gas, and propane as individual reducing agents are shown in FIGS. 4, 5, and 6, respectively. These results indicate that the maximum rate of conversion was observed when the individual reducing agents were used in the following concentrations: 30 mole % carbon monoxide, 5 mole % natural gas, and 2 mole % propane. These concentrations are in general agreement with the stoichiometric amount of reductant required for the conversion of calcium sulfate into calcium oxide. The most likely explanation for the lower rate of conversion observed when the reducing gas concentration was either smaller or larger than the optimum value is the following: for concentrations less than the optimum value, the rate of conversion of calcium sulfate to calcium oxide was proportional to reactant gas concentration which is normal. For concentrations greater than the optimum value, the rate of conversion of calcium sulfate to calcium oxide was depressed by the simultaneous conversion of part of the calcium sulfate to calcium sulfide.

Figure 7:
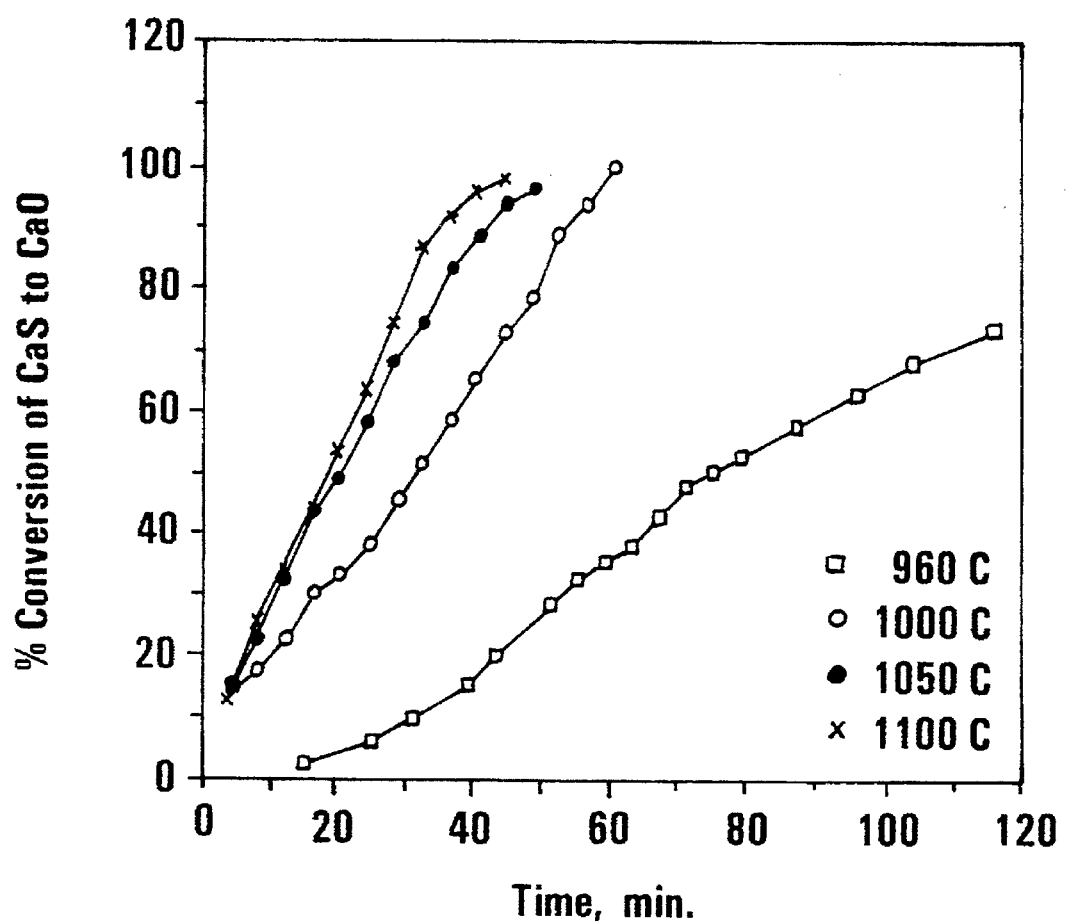
FIG. 7 is a graph of the data obtained in a series of TGA runs in which a pellet of calcium sulfide was treated by the cyclic process with 20 mole % oxygen and 30 mole % carbon monoxide at various temperatures.

For investigating the effect of reaction temperature on the rate of conversion, an oxygen concentration of 20 mole % was employed during the oxidizing phase and a carbon monoxide concentration of 30 mole % was employed during the reducing phase of each cycle. The results of a series of runs made at different temperatures are indicated by FIG. 7. It can be seen that the overall rate of conversion increased with increasing temperature over the range of temperature explored, i.e., from 960° to 1100° C. However, the increase in the rate of reaction between 1050° and 1100° C. was very slight.

EXAMPLE III

In a typical industrial application of the two-zone fluidized bed process of this invention, calcium sulfide particles are converted to calcium oxide particles continuously in a two-zone fluidized bed supplied with air and natural gas and heated to 1000° C. The process is carried out in a reaction system such as portrayed by FIG. 8. Air is introduced through a refractory grid plate at the bottom of the fluidized bed, creating an oxidizing zone in the lower part of the bed. Natural gas is introduced through a second gas distributor which is located in the mid-region of the fluidized bed, creating a reducing zone in the upper part of the bed. Since the natural gas is diluted immediately upon entering the fluidized bed, the reacting particles will not be exposed to excessively high concentrations of reducing gas which can reform calcium sulfide. Because the oxidation of calcium sulfide generates a large mount of heat, water is introduced directly into the fluidized bed to remove part of the heat. Some of the heat is also removed by the endothermic reduction of calcium sulfate to calcium oxide and by heating the various reactants from ambient temperature to the temperature of the fluidized bed. Although water can be introduced almost anywhere in the fluidized bed for the purpose of cooling, it is introduced advantageously through the same distributor used for introducing the reducing gas. In this way a gas distributor made of metal pipe or tubing (e.g., type 446 stainless steel) is employed because its temperature is maintained well below the temperature of the fluidized bed due to the cooling provided by the water as it is heated and converted into steam. Otherwise without the cooling effect of the water, it would be necessary to introduce the reducing gas through a distributor made of refractory materials which can withstand the corrosive effects of the hot, sulfurous gases present in the fluidized bed. These gases are especially corrosive at higher temperatures. Needless to say, a gas distributor made of a refractory material would be much more cumbersome and costly to construct than one made of metal tubing. The gas distributor constructed from metal tubing is in the form of an open grid which does not interfere with particle circulation in the fluidized bed.

Figure 8:
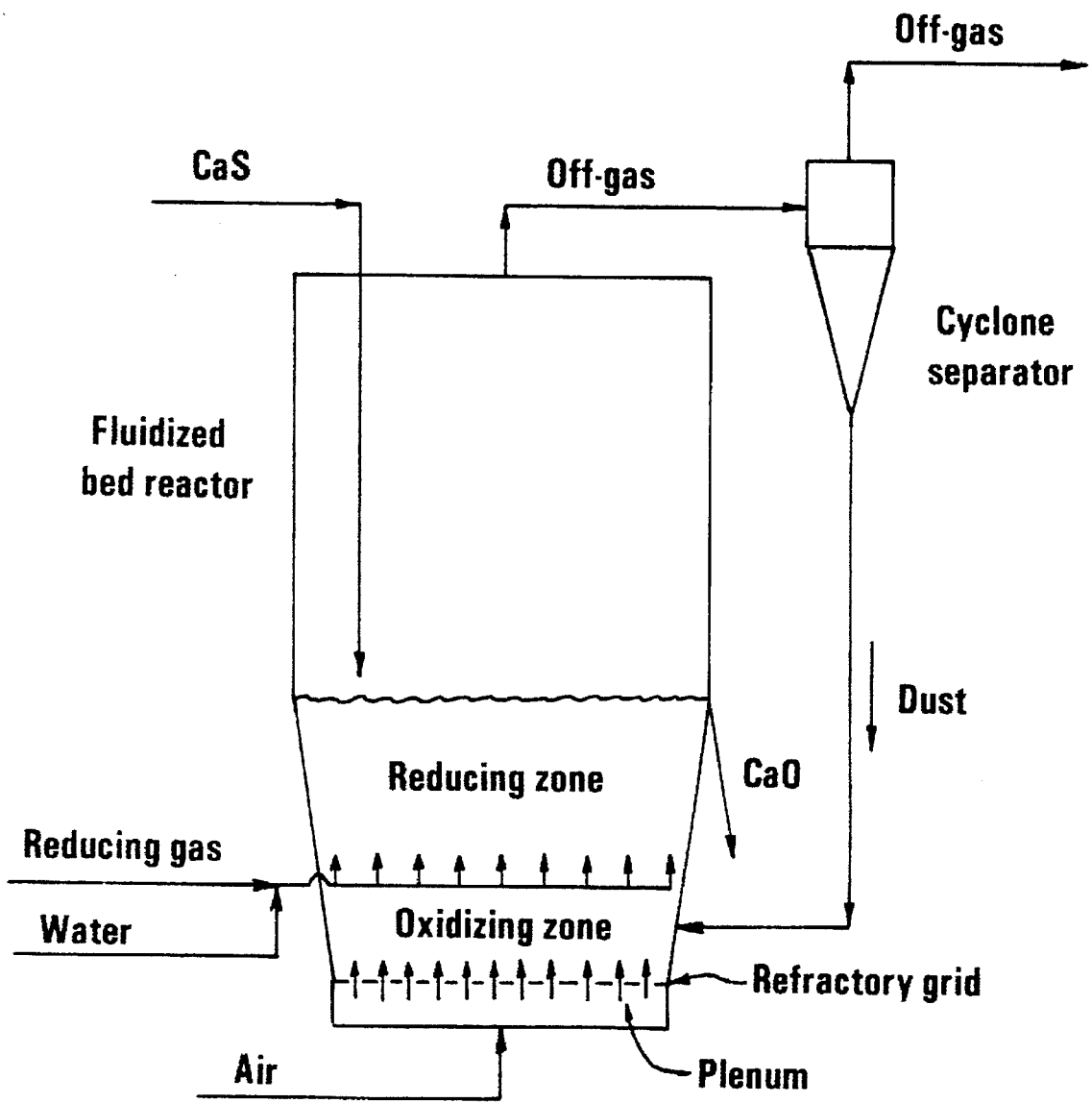
FIG. 8 is a cross-sectional elevational view of a fluidized bed reactor equipped with means for concurrently maintaining a reducing zone above an oxidizing zone within the same fluidized bed.

The calcium sulfide particles are introduced directly into the fluidized bed as indicated in FIG. 8 or alternately into the reactor off-gas stream between the reactor and cyclone separator. If the latter method is employed, the particles are recovered by the cyclone along with dust entrained in reactor off-gas and returned to the reactor. By introducing the particles into the off-gas, some heat is recovered from the off-gas which increases the overall thermal efficiency of the process. Also the particles are subjected to less thermal shock than when they are introduced directly into the fluidized bed. Therefore, particle decrepitation is reduced. While the particles reside in the fluidized bed, they circulate freely between the two zones and are subjected alternately and repeatedly to oxidation and reduction which over time converts them to calcium oxide. The reacted particles are removed subsequently and continuously through an overflow tube.

The walls of the reactor are tapered as indicated in FIG. 8 so that the superficial gas velocity is nearly constant between the top and bottom of the fluidized bed. This design promotes smoother fluidization than one which causes the gas velocity to vary greatly between the top and bottom. Inevitably some of the finer particles are elutriated from the fluidized bed and entrained in the off-gas. The freeboard between the top of the fluidized bed and the top of the reactor vessel is designed by well known methods to minimize particle entrainment in the off-gas. Most of the particles remaining in the off-gas are recovered by the cyclone separator and returned to the reactor.

In operation the reactants are supplied to the fluidized bed in proportions which promote reaction 1 in the oxidizing zone and reactions such as reaction 4 in the reducing zone so that the overall process takes place in accordance with a reaction such as reaction 7. For purposes of illustration it is assumed that natural gas consists largely of methane. Therefore, under ideal conditions 2 moles of oxygen and 0.25 mole of methane are required for the reaction of each mole of calcium sulfide. Consequently, 9.52 moles of air and 0.25 mole methane are supplied to the reactor for each mole of calcium sulfide.

Since reaction 11 generates more heat than is required to maintain a reaction temperature of 1000° C. or more, cooling water is introduced into the fluidized bed. The quantity of cooling water is estimated by simultaneous solution of the material and energy balances for the reaction system. Such an estimate was made based on the following assumptions: reactants and cooling water supplied at 25° C., natural gas consisting of 90 mole % $CH_4$, and 10 mole % $N_2$ utilized, reaction temperature of 1025° C., negligible heat losses, reactants supplied in stoichiometric proportions, feed particles introduced directly into the fluidized bed, and complete conversion of calcium sulfide to calcium oxide. For these conditions, 3.43 moles of cooling water are required for each mole of calcium sulfide reacted. Consequently, for each mole of calcium sulfide reacted, the following quantities of gaseous products are produced:

|        | moles | mole % |
|--------|-------|--------|
| $SO_2$ | 1.00  | 7.8    |
| $CO_2$ | 0.25  | 2.0    |
| $H_2O$ | 3.93  | 30.9   |
| $N_2$  | 7.55  | 59.3   |
|        | 12.73 | 100.0  |

These results show that the off-gas will contain 7.8 mole % sulfur dioxide which is equivalent to 11.4 mole % on a dry basis. A concentration of this magnitude is suitable for subsequent conversion of sulfur dioxide into sulfuric acid by known methods.

Since the gases leave the fluidized bed reactor at a temperature of 1000° C. or more, they contain sensible heat which can be recovered advantageously by employing a waste heat boiler which generates steam. The steam can be used either for industrial process heating or power generation.

The quicklime produced by this process is virtually free of calcium sulfide and is suitable for various purposes such as the adsorption of sulfurous gases in either coal gasifiers or flue gas desulfurization systems, the stabilization of soils used for road bases, and the production of cement clinker.

EXAMPLE IV

When producer gas made from coal or coke is used in the two-zone fluidized bed process of this invention, only slight modification of the conditions described in Example III is necessary. Based on a typical producer gas consisting of 25.3 mole % CO, 13.2 mole % $H_2$, 5.4 mole % $CO_2$, and 56.1 mole % $N_2$, the simultaneous solution of the material and energy balances around the reaction system shows that for the conversion of one mole of calcium sulfide to calcium oxide at 1025° C. under ideal conditions the following quantities are required: 9.52 moles air, 2.60 moles producer gas, and 3.56 moles cooling water. For each mole of calcium sulfide reacted, the following quantities of gaseous products are produced:

|        | moles | mole % |
|--------|-------|--------|
| $SO_2$ | 1.00  | 6.9    |
| $CO_2$ | 0.66  | 4.5    |
| $H_2O$ | 3.90  | 28.9   |
| $N_2$  | 8.96  | 61.7   |
|        | 14.52 | 100.0  |

These results indicate that the off-gas contains 6.9 mole % sulfur dioxide which is equivalent to 9.4 mole % on a dry basis. While the concentration of sulfur dioxide is slightly lower than noted in Example III, the concentration is still adequate for conversion of sulfur dioxide into sulfuric acid. The quicklime is similar to that produced under the conditions of Example III, and heat can be recovered from the off-gas by employing a waste heat boiler to generate steam.

EXAMPLE V

Figure 9:
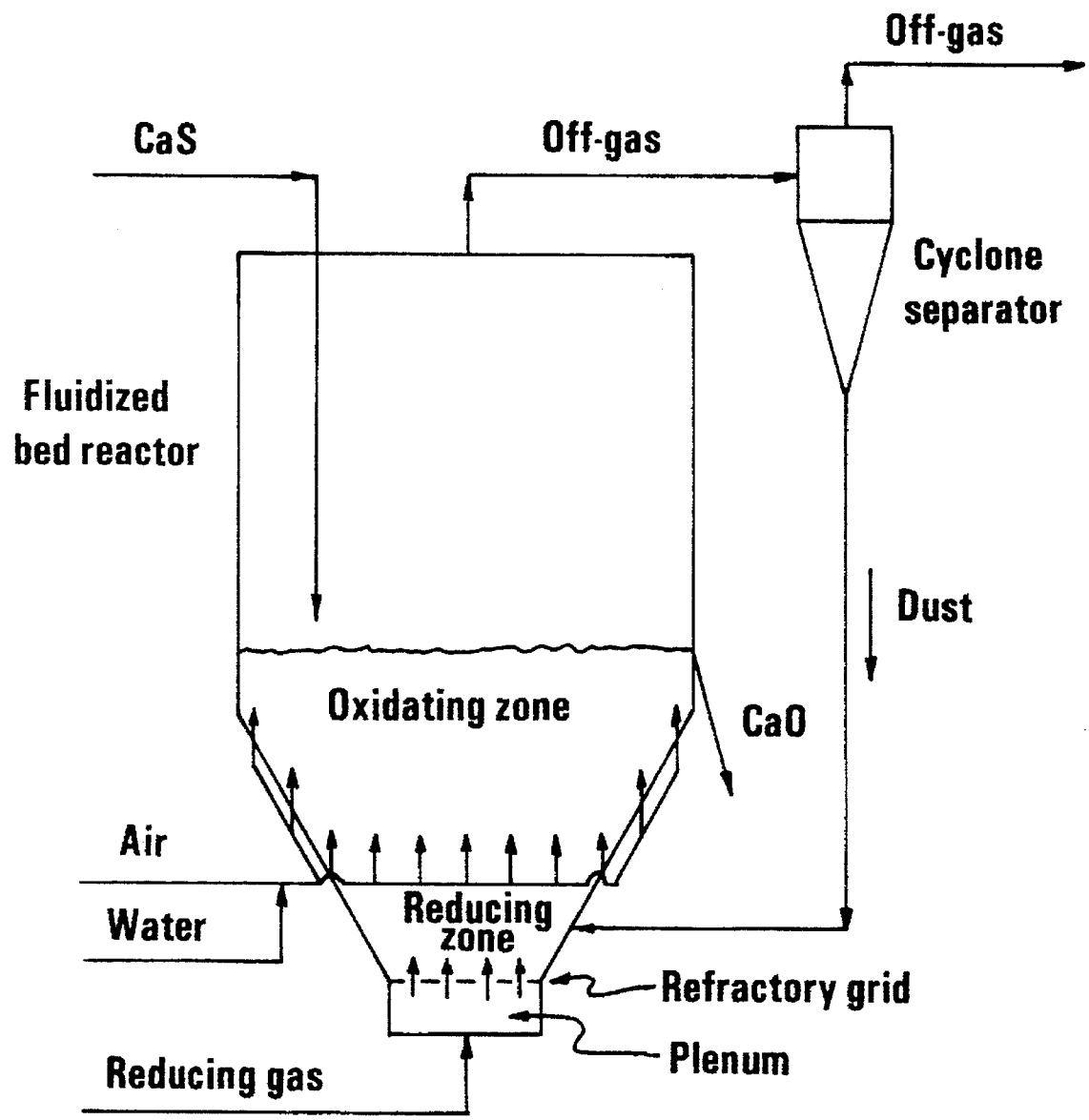
FIG. 9 is a cross-sectional elevational view of a fluidized bed reactor equipped with means for concurrently maintaining an oxidizing zone above a reducing zone within the same fluidized bed.

When a less concentrated reducing agent such as producer gas is available for use in the two-zone fluidized bed process of this invention, an alternative method of practicing the invention is to interchange the oxidizing and reducing zones so that the oxidizing zone is above the reducing zone as indicated in FIG. 9. In this case the reducing gas is introduced through the refractory grid at the bottom of the fluidized bed, and air is introduced at a higher level in the bed through a second gas distributor and also through ports or nozzles located in the sloping sides of the vessel which contains the fluidized bed. Since the volumetric flow rate of the reducing gas is much less than the volumetric flow rate of the oxidizing gas, maintaining a constant superficial gas velocity within the fluidized bed requires that the diameter of the bottom of the bed be much smaller than the diameter of the top of the bed. This requirement is met by sloping the slides of the vessel at an angle of 45° to 60° with the horizontal. To maintain bed fluidization in the region above the sloping sides, air is introduced through ports or nozzles located along the sloping sides. Cooling water is introduced along with air through the upper gas distribution grid within the fluidized bed for the purpose of cooling both the bed and the distributor.

Calcium sulfide particles are introduced into and removed from the fluidized bed as in the previous examples. Also the off-gas is treated in a cyclone separator as before to remove entrained dust.

Interchanging the location of the oxidizing and reducing zones does not affect the material and energy balances for an ideal reaction system as represented by FIGS. 8 and 9. Therefore, when a producer gas and operating conditions such as those described in Example IV are employed with the fluidized bed shown in FIG. 9, the various input requirements are the same as in Example IV. Consequently, the amount and composition of the reactor off-gas are the same as in Example IV. Also the solid product is the same as in the previous examples.

EXAMPLE VI

Utilization of a concentrated reducing agent such as natural gas with a large concentration of methane and possibly other hydrocarbons in the lower zone of the two-zone fluidized bed process exemplified by FIG. 9 requires dilution of the reducing agent with an inert gas such as nitrogen or carbon dioxide. Otherwise calcium sulfate formed in the oxidizing zone will be reduced to calcium sulfide instead of calcium oxide. A possible source of inert gas is the tail gas from an integrated process exemplified by FIG. 10 in which the sulfur dioxide produced from calcium sulfide is converted subsequently to elemental sulfur by a reduction process. After the sulfur is condensed, the remaining gas will be largely nitrogen mixed with a small mount of carbon dioxide. Some of this gas can be recycled and used to dilute the concentrated reducing agent.

To illustrate the application of this invention, natural gas consisting of 90 mole % methane and 10 mole % nitrogen is mixed with recycled gas consisting of 96.8 mole % nitrogen and 3.2 mole % carbon dioxide in such proportions as to provide a reducing gas with the following composition: 10.0 mole % methane, 2.8 mole % carbon dioxide and 87.2 mole % nitrogen. The reducing gas is supplied to the lower zone of the two-zone fluidized bed reactor represented by FIG. 9, and air and cooling water are supplied to the upper zone. Simultaneous solution of the material and energy balances for an ideal case shows that the conversion of each mole of calcium sulfide to calcium oxide requires 2.50 moles of reducing gas, 9.52 moles of air, and 2.56 moles of cooling water. The conversion of each mole of calcium sulfide results in the following quantities being present in the reactor off-gas:

|  | moles | mole % |
|---|---|---|
| $SO_2$ | 1.00 | 7.1 |
| $CO_2$ | 0.32 | 2.3 |
| $H_2O$ | 3.06 | 21.7 |
| $N_2$ | 9.73 | 68.9 |
|  | 14.11 | 100.0 |

These results indicate that the off-gas contains 7.1 mole % sulfur dioxide which is equivalent to 9.0 mole % on a dry basis. Consequently, the results are similar to those shown in the previous examples.

EXAMPLE VII

An alternative method of applying the fluidized bed process of this invention is to vary the gas composition of the entire bed in a periodic manner. This is accomplished by varying the composition of the gas supplied through the gas distributor in the bottom of the fluidized bed. The gas composition is varied in a cyclic manner by introducing air during one part of the cycle and a reducing gas during another part of the cycle. Since all of the gaseous reactants are introduced through the bottom distributor plate, the design of the fluidized bed reactor is simpler than for the preceding examples. The cycle time is controlled automatically by a timing device or clock which periodically supplies a signal to open or close valves in the pipelines that supply air and a reducing gas to the fluidized bed reactor as shown in FIG. 11. Either electrically or pneumatically operated control valves can be used. Typically, the cycle time will fall within the range of 1 to 10 min. Generally, the reducing phase of the cycle will be shorter than the oxidizing phase since the process requires less reducing gas than oxidizing gas. Cooling water is also introduced during the oxidizing phase to control the temperature of the fluidized bed. The water can be fed through tuyères located in the sides of the reactor or through separate nozzles attached to the gas distributor plate at the bottom of the reactor. To maintain a relatively constant superficial gas velocity throughout any given cycle, the volumetric flow rate of air and steam generated by vaporizing cooling water during the oxidizing phase of the cycle will be set equal to the volumetric flow rate of reducing gas during the reducing phase of the cycle. Other features of the fluidized bed reactor will be similar to those described in the previous examples.

When a producer gas having the composition indicated in Example IV is utilized for this process, the overall requirements for producer gas, air, and cooling water are the same as noted in Examples IV and V. In other words, 2.60 moles producer gas, 9.52 moles air, and 3.56 moles cooling water are required for the conversion of each mole of calcium sulfide to calcium oxide. To maintain a constant superficial gas velocity throughout any given cycle, producer gas is introduced during 18% of the cycle and air and cooling water during 82% of the cycle. In this way the oxidizing and reducing agents are also kept in the proportions required for oxidation (reaction 1) and reduction (reactions 2 and 3). While the fluidized bed temperature will fluctuate during each cycle because the oxidation phase is exothermic and the reduction phase is endothermic, an average bed temperature of approximately 1025° C. can be maintained. The composition of the reactor off-gas will also vary during each cycle since most of the sulfur dioxide will appear in the off-gas during the reducing phase. However, the composition of the off-gas averaged over several cycles will be the same as the composition noted in Examples IV and V. The quicklime will be similar in all respects to that produced in the previous examples.

EXAMPLE VIII

The cyclic process of Example VII can be used with a more concentrated reducing gas such as the natural gas described in Example III provided the gas is diluted with an inert gas as in Example VI. The overall inputs of natural gas, air, and cooling water will be the same as in Example VI. Although the reactor off-gas composition will vary within any given cycle, the off-gas composition averaged over several cycles will be the same as that noted for the off-gas in Example VI. The quicklime will be similar in all respects to that produced in the previous examples.

EXAMPLE IX

Particles which are too large to be treated in a fluidized bed reactor can be treated in either fixed bed or moving bed reactors by the cyclic oxidation/reduction process which converts calcium sulfide to calcium oxide. For example, particles which are 1 to 2 cm in diameter can be treated continuously in a vertical tubular moving bed reactor that is 0.5 meter or more in diameter and several meters tall. The reactor is filled with particles undergoing treatment as they move downward. Fresh particles are supplied continuously at the top of the reactor and treated particles are removed contiuously from the bottom of the reactor. A gas mixture which is alternately oxidizing and reducing is supplied at the bottom of the reactor. Generally, the gas mixture supplied at the bottom of the reactor is at ambient temperature. As the gas rises through the moving bed of solids, it is heated by contact with the hot particles of calcium oxide. At a particular level in the bed, the gas encounters particles undergoing reaction, and the gas reacts with the particles. The reaction zone can extend over a vertical distance of 0.5 m more or less. The reacted hot gas continues upward through the upper part of the bed where it can preheat the incoming solids and then leave the reactor somewhat cooled.

Since the overall process generates more heat than is needed to raise the solid and gaseous reactants to reaction temperature, some means must be provided for removing excess heat. In the case of smaller diameter reactors (e.g., diameter <0.5 m), a significant quantity of heat can be lost through the reactor walls. However, the use of larger reactors requires other means of heat removal. A practical means of heat removal is to dilute the gaseous reactants with an inert gas such as the tail gas from an integrated process such as that indicated by FIG. 10. If the inert gas is supplied in sufficient quantity, it can carry away the excess heat and, at the same time, it can serve to dilute a concentrated reducing agent such as natural gas.

To illustrate the application of this invention, a moving bed reactor is supplied alternately with air and natural gas (90 mole % $CH_4$, 10 mole % $N_2$) both being diluted with recycled gas consisting of 96.8 mole % nitrogen and 3.2 mole % carbon dioxide. The gas mixture is supplied at a temperature of 25° C. to the reactor whereas calcium sulfide particles are supplied at a temperature of 1025° C. Since the feed particles are at the reaction temperature, there is no exchange of heat between the gas leaving the reactor and the incoming feed. On the other hand, there is an exchange of heat between the gas entering the reactor and the particles leaving so that the particles are cooled to a temperature near that of the incoming gas. Under these conditions, it is necessary to supply 12.1 moles of recycled gas per mole of calcium sulfide to carry away the excess heat. Although the gas composition varies throughout each oxidation/reducing cycle, the average composition of the gas leaving the reactor over a number of cycles and the number of moles of gas leaving the reactor for each mole of CaS reacted are as follows:

|  | Moles | mole % |
|---|---|---|
| $SO_2$ | 1.000 | 4.7 |
| $CO_2$ | 0.637 | 3.0 |
| $H_2O$ | 0.5000 | 2.3 |
| $N_2$ | 19.264 | 90.0 |
| Total | 21.401 | 100.0 |

While the concentration of sulfur dioxide (4.7 mole %) is low because of the large amount of gas recycled, this example represents an extreme case where no heat is lost through the reactor walls and feed particles containing 100% calcium sulfide are supplied at the reaction temperature. For other cases where there is either a significant heat loss or the feed is supplied at a lower temperature and possibly containing less than 100% calcium sulfide, the quantity of recycled gas will be lower and the gas leaving the reactor will have a greater concentration of sulfur dioxide.

EXAMPLE X

Calcium sulfide containing particles which are too large to be treated in a fluidized bed reactor can be converted to calcium oxide in a fixed bed reactor by employing the cyclic oxidation/reduction process in the manner illustrated by FIG. 13. During the oxidation phase of each cycle, air is combined with recycled inert gas, and the mixture is preheated by passage through a regenerative heat exchanger which could be in the form of an inert pebble bed (see FIG. 13a). The hot oxidizing gas is supplied to the fixed bed reactor where it reacts first with the particles at the bottom of the bed, but only a small portion of each particle reacts before the reaction stops due to pore plugging. The reaction front then proceeds layer by layer up the bed. Since the oxidation of calcium sulfide is highly exothermic, the gas temperature and the bed temperature both rise. The rise in temperature is kept in bounds by mixing a considerable quantity of recycled inert gas with the air supplied to the reactor. During the oxidizing phase, most of the oxygen is consumed in converting calcium sulfide into calcium sulfate. Therefore, the hot gas leaving the reactor is largely nitrogen with only traces of oxygen and sulfur dioxide. Much of the sensible heat in the reactor off-gas is recovered by passage through another regenerative heat exchanger. Since not all of the heat produced by oxidation can be utilized in the next phase of the cycle, a second heat exchanger, which could be in the form of a waste heat boiler, is placed after the regenerative heat exchanger. The cooled gas is then stored in an expandable gas holder where it can be drawn on as a source of inert gas during each phase of the oxidation/ reduction cycle.

Shortly before the oxidation front reaches the top of the fixed bed reactor, the input of air is stopped and the flow of inert gas through the reactor is reversed. At the same time, a reducing gas such as coal derived producer gas or natural gas is added to the gas stream passing through the reactor as indicated in FIG. 13b. The gas mixture is preheated by passage through the regenerative heat exchanger and then begins reacting with the top layer of particles in the fixed bed reactor. The calcium sulfate formed during the preceding phase is converted to calcium oxide and sulfur dioxide. As the calcium sulfate is consumed layer by layer, the reaction front proceeds down the bed. Since the reaction is moderately endothermic, the bed temperature and gas temperature both decrease, but the drop in temperature is moderated by the presence of an appreciable quantity of hot inert gas. During the reducing phase, most of the reducing gas is consumed so that the gas leaving the reactor is largely nitrogen and sulfur dioxide. After the hot gas leaves the bottom of the reactor, it is cooled by passage through the regenerative heat exchanger which is used for preheating the gas supplied during the next phase of the cycle. Shortly before the reducing reaction front reaches the bottom of the reactor, the input of reducing gas is halted and the flow of gas through the reactor is reversed to start another cycle.

This method of treatment is particluarly advantageous for the regeneration of large particles which are used as sorbent for $H_2S$ and COS since it does not require that the particles be moved or handled which is likely to cause attrition and breakage of the particles. After the bed has been regenerated, it can be returned to service as a gas adsorber by simply directing the flow of gas to be cleaned through the bed. This method also provides a unique method for removing heat from the system without excessive dilution of the product gas. Consequently, the product gas composition is determined by the stoichiometry of the overall reaction. For the case where natural gas consisting entirely of methane is used as a reducing gas, the required inputs and outputs of the process are determined by overall reaction 7, i.e., 2 moles of oxygen and 0.25 mole of methane are required for each mole of calcium sulfide reacted. Based on the stoichiometry of reaction 7, the product gas will have the following composition:

|  | mole % |
|---|---|
| $SO_2$ | 10.8 |
| $CO_2$ | 2.7 |

|       | mole %       |
|-------|--------------|
| H₂O   | 5.4          |
| N₂    | 81.1         |
|       | 100.0        |

The concentration of sulfur dioxide in the gas is significantly greater than that indicated for the previous examples While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

APPENDIX

[1] Clean Coal Technology Demonstration Program (Program Update 1991), DOE/FE-0247P, February, 1992, U.S. Department of Energy, Assistant Secretary for Fossil Energy, Washington, D.C. 20585.

[2] J. Abbasian, A. Rehmat, and D. D. Banerjee, "Sulfation of Partially Sulfided Calcium-Based Sorbents," *Ind. Eng. Chem. Res.*, 30, 1990–1994 (1991).

[3] D. C. Lynch and J. F. Elliott, "Analysis of the Oxidation Reactions of CaS," *Metallurgical Transactions B*, 11B, 415–425 (1980).

[4] R. J. Torres-Ordonez, J. P. Longwell, and A. F. Sarofim, "Intrinsic Kinetics of CaS(s) Oxidation," *Energy & Fuels*, 3, 506–515 (1989).

[5] D. C. Lynch and J. F. Elliott, "Kinetics of the Oxidation of CaS," *Metallurgical Transactions B*, 9B, 691–704 (1978).

[6] G. Moss, "Converting Calcium Sulphide to Calcium Oxide," U. S. Pat. No. 4,216,197, Aug. 5, 1980.

[7] G. Moss, "Integrated Process for Converting Sulfur-Containing Fuels to Low Sulfur Combustible Gas," U.S. Pat. No. 4,255,162, Mar. 10, 1981.

[8] C. E. Morris, T. D. Wheelock, and L. L. Smith, "Processing Waste Gypsum in a Two-Zone Fluidized Bed Reactor," in: *New Developments in Fluidization and Fluid-Particle Systems*, Wen-ching Yang (ed.), American Institute of Chemical Engineers, New York, 1987, pp. 94–104.

[9] T. D. Wheelock and T. Riel, "Cyclic Operation of a Fluidized Bed Reactor for Decomposing Calcium Sulfate," *Chemical Engineering Communications*, 109, 155–166(1991).

[10] T. D. Wheelock, "Simultaneous Reductive and Oxidative Decomposition of Calcium Sulfate in the Same Fluidized Bed," U.S. Pat. No. 4,102,989, Jul. 25, 1978.

T. D. Wheelock, "Cyclical Reductive and Oxidative Decomposition of Calcium Sulfate in Two-stage Fluidized Bed Reactor," Australian Patent No. 618307.

I claim:

1. A process for oxidizing calcium sulfide, comprising the steps of:

exposing particles comprising calcium sulfide to a treatment cycle consisting essentially of an oxidizing phase comprising oxidizing conditions and a reducing phase comprising reducing conditions and, a temperature within a temperature range of about 900° C. to about 1200° C. in a reactor;

repeating said treatment cycle at least three times in the reactor whereby substantially all the calcium sulfide is converted to calcium oxide; and removing excess heat of reaction, above heat required to maintain said temperature, from the reactor, wherein the oxidizing conditions and reducing conditions are provided in a fixed bed reactor by supplying gas of varying compositions to the reactor in a periodic manner so that gas flowing through the reactor is alternately oxidizing and reducing.

2. The process of claim 1 wherein the oxidizing conditions are achieved by supplying a gas mixture containing 5 to 21% oxygen.

3. The process of claim 1 wherein the reducing conditions are achieved by supplying a gas mixture containing from 1 to 50% reducing gas.

4. The process of claim 2 wherein the gas mixture comprises air.

5. The process of claim 3 wherein the reducing gas is selected from the group consisting of CO, H₂, CH₄, C₂H₆, C₃H₈ and mixtures thereof.

6. The process of claim 3 wherein the reducing gas is selected from the group consisting of natural gas and a product of coal gasification.

7. The process of claim 1 comprising supplying two moles of oxygen gas for each mole of calcium sulfide.

8. The process of claim 1 comprising diluting the reducing gas with a product gas collected during oxidation.

9. The process of claim 1 comprising preheating gas supplied to the fixed bed reactor by passage through a regenerative heat exchanger, and cooling gas which leaves the fixed bed reactor by passage through another regenerative heat exchanger so that upon reversal of gas flow, heat which is recovered from reactor off-gas is used to preheat gas fed to the fixed bed reactor.

10. The process of claim 1 comprising recovering reactor off-gas produced during the oxidizing phase of each cycle and diluting gas supplied to the reactor during the oxidizing phase and the reducing phase of each cycle with recovered reactor off-gas.

11. The process of claim 1 wherein an amount of heat produced during the oxidizing phase of each cycle in excess of an amount of heat required for preheating gas supplied to the reactor during the reducing phase of each cycle is recovered by means of a heat exchanger located downstream from the reactor and a regenerative heat exchanger.

12. The process of claim 1 wherein the reducing gas is supplied in approximately a stoichiometric amount required to convert calcium sulfate to calcium oxide, the calcium sulfate being the oxidation product of calcium sulfide.

13. The process of claim 1 wherein the oxidizing gas comprises a mixture of air and recycled gas collected during oxidation.

14. A process for oxidizing calcium sulfide, comprising the steps of:

exposing particles comprising calcium sulfide to a treatment cycle consisting essentially of an oxidizing phase comprising oxidizing conditions and a reducing phase comprising reducing conditions, and a temperature within a temperature range of about 900° C. to about 1200° C. in a reactor;

repeating said treatment cycle at least three times in the reactor whereby substantially all the calcium sulfide is converted to calcium oxide;

removing excess heat of reaction, above heat required to maintain said temperature, from the reactor, wherein the oxidizing conditions and reducing conditions are provided in a moving bed reactor by supplying gas of varying compositions to the reactor in a periodic manner so that gas flowing through the reactor is alternately oxidizing and reducing; and treating fluidized bed reactor off-gas to remove sulfur dioxide and result in tail gas; and recycling tail gas to dilute the reducing gas supplied to the reactor.

15. The process of claim 14 wherein the oxidizing conditions and reducing conditions are provided in a moving bed reactor by supplying gas of varying compositions to the reactor in a periodic manner so that gas flowing through the reactor is alternately oxidizing and reducing.

16. The process of claim 15 wherein the oxidizing conditions are achieved by supplying a gas mixture comprising 5 to 30% oxygen.

17. The process of claim 15 wherein the reducing conditions are achieved by supplying a gas mixture comprising from 1 to 50% reducing gas.

18. The process of claim 16 wherein the gas mixture comprises air.

19. The process of claim 17 wherein the reducing gas is selected from a group consisting of CO, $H_2$, $CH_4$, $C_2H_6$, $C_3H_8$, and mixture thereof.

20. The process of claim 17 comprising supplying about two moles of oxygen gas for each mole of calcium sulfide.

21. The process of claim 15 comprising supplying about two moles of oxygen gas for each mole of calcium sulfide.

22. The process of claim 15 wherein the reducing gas is supplied in approximately a stoichiometric amount required to convert substantially all the calcium sulfate to calcium oxide, the calcium sulfate being the oxidation product of calcium sulfide.

23. A process for oxidizing calcium sulfide, comprising the steps of:

exposing particles comprising calcium sulfide to a treatment cycle consisting essentially of an oxidizing phase comprising oxidizing conditions and a reducing phase comprising reducing conditions and, a temperature within a temperature range of about 900° C. to about 1200° C. in a reactor;

repeating said treatment cycle at least three times in the reactor whereby substantially all the calcium sulfide is converted to calcium oxide;

removing excess heat of reaction, above heat required to maintain said temperature, from the reactor, wherein the oxidizing conditions and the reducing conditions are provided in a fluidized bed reactor having a fluidized bed comprising an oxidizing zone in one part and a reducing zone in another part such that the particles circulate freely between the two zones, wherein a reducing zone is provided in a lower part of the fluidized bed by introducing a reducing gas mixture comprising from about 1 to about 50% reducing gas in the reducing zone, and an oxidizing zone is provided in an upper part of the fluidized bed by introducing an oxidizing gas mixture comprising from about 10 to about 90% oxygen; and treating fluidized bed reactor off-gas to remove sulfur dioxide and result in tail gas; and recycling tail gas to the reducing zone to dilute reducing gas in the fluidized bed.

24. The process of claim 23 wherein said oxidizing phase is provided by introducing an oxidizing gas mixture comprising from 5 to 30% oxygen in said reactor, and said reducing phase is provided by introducing a reducing gas in said reactor.

25. The process of claim 24 wherein the oxidizing gas comprises air.

26. The process of claim 24 comprising supplying about two moles of oxygen gas for each mole of calcium sulfide.

27. The process of claim 24 wherein the reducing gas is selected from the group consisting of CO, $H_2$, $CH_4$, $C_2H_6$, $C_3H_8$ and mixtures thereof.

28. The process of claim 24 wherein the reducing gas comprises a member selected from the group consisting of natural gas and a product of coal gasification.

29. The process of claim 24 wherein exposing particles comprising calcium sulfide to oxidizing conditions results in an oxidation product comprising calcium sulfate, and wherein the reducing gas is supplied in approximately the stoichiometric amount required to convert substantially all the calcium sulfate to calcium oxide.

30. The process of claim 24 comprising introducing water into the fluidized bed to absorb heat and control temperature.

31. The process of claim 30 wherein a fluid distribution system is used for introducing the oxidizing gas into the oxidizing zone and the water into the fluidized bed.

32. The process of claim 24 wherein the fluidized bed reactor comprises tapered walls so that a linear gas velocity based on a free cross-sectional area of the fluidized bed reactor at the top of the fluidized bed is approximately the same as that at the bottom of the bed, wherein the free cross-sectional area is a cross-sectional area of the reactor when no solids are present.

33. A process for oxidizing calcium sulfide, comprising the steps of:

exposing particles comprising calcium sulfide to a treatment cycle consisting essentially of an oxidizing phase comprising oxidizing conditions and a reducing phase comprising reducing conditions and, a temperature within a temperature range of about 900° C. to about 1200° C. in a reactor;

repeating said treatment cycle at least three times in the reactor whereby substantially all the calcium sulfide is converted to calcium oxide;

removing excess heat of reaction, above heat required to maintain said temperature, from the reactor, wherein the oxidizing conditions and the reducing conditions are provided in a fluidized bed reactor having a fluidized bed comprising an oxidizing zone in one part and a reducing zone in another part such that the particles circulate freely between the two zones, wherein a reducing zone is provided in a lower part of the fluidized bed by introducing a reducing gas mixture comprising from about 1 to about 50% reducing gas in the reducing zone, and an oxidizing zone is provided in an upper part of the fluidized bed by introducing an oxidizing gas mixture comprising from about 10 to about 90% oxygen; and introducing water into the fluidized bed to absorb heat and control bed temperature.

34. The process of claim 33 wherein the oxidizing gas comprises air.

35. The process of claim 33 comprising supplying two moles of oxygen gas for each mole of calcium sulfide.

36. The process of claim 33 wherein the reducing gas is selected from the group consisting of CO, $H_2$, $CH_4$, $C_2H_6$, $C_3H_8$ and mixtures thereof.

37. The process of claim 33 wherein the reducing gas comprises a member selected from the group consisting of natural gas and a product of coal gasification.

38. The process of claim 33 wherein the reducing gas is supplied in approximately a stoichiometric mount required to convert substantially all the calcium sulfate to calcium oxide, the calcium sulfate being the oxidation product of calcium sulfide.

39. The process of claim 33 wherein the fluidized bed reactor comprises tapered walls so that a linear gas velocity based on a free cross-sectional area of the fluidized bed reactor at the top of the fluidized bed is approximately the same as that at the bottom of the bed, wherein the free cross-sectional area is a cross-sectional area of the reactor when no solids are present.

40. A process for oxidizing calcium sulfide, comprising the steps of:

exposing particles comprising calcium sulfide to a treatment cycle consisting essentially of an oxidizing phase comprising oxidizing conditions and a reducing phase comprising reducing conditions and, a temperature within a temperature range of about 900° C. to about 1200° C. in a reactor;

repeating said treatment cycle at least three times in the reactor whereby substantially all the calcium sulfide is converted to calcium oxide;

removing excess heat of reaction, above heat required to maintain said temperature, from the reactor, wherein the oxidizing conditions and reducing conditions are provided in a fluidized bed reactor by supplying gas of varying compositions to the fluidized bed reactor in a periodic manner so that the gas throughout the reactor is alternately oxidizing and reducing; and treating fluidized bed reactor off-gas to remove sulfur dioxide and result in tail gas; and recycling tail gas to dilute reducing gas supplied to the fluidized bed.

41. The process of claim 40 wherein the oxidizing conditions are achieved by supplying a gas mixture containing 5 to 30% oxygen.

42. The process of claim 40 wherein the reducing conditions are achieved by supplying a gas mixture containing from 1 to 50% reducing gas.

43. The process of claim 41 wherein the gas mixture comprises air.

44. The process of claim 42 wherein the reducing gas is selected from a group consisting of CO, $H_2$, $CH_4$, $C_2H_6$, $C_3H_8$ and mixtures thereof.

45. The process of claim 42 wherein the reducing gas comprises a member selected from a group consisting of natural gas and a product of coal gasification.

46. The process of claim 40 comprising supplying two moles of oxygen gas for each mole of calcium sulfide.

47. The process of claim 40 wherein the reducing gas is supplied in approximately a stoichiometric amount required to convert substantially all the calcium sulfate to calcium oxide, the calcium sulfate being the oxidation product of calcium sulfide.

48. The process of claim 40 comprising treating fluidized bed reactor off-gas to remove sulfur dioxide and result in tail gas; and recycling tail gas to the reducing zone to dilute reducing gas supplied to the fluidized bed.

49. The process of claim 40 comprising introducing water into the fluidized bed during the oxidizing phase of each cycle to absorb heat and control bed temperature.

50. The process of claim 40 wherein the time of the oxidizing phase and the time of the reducing phase of each cycle are selected to provide stoichiometric proportions of oxidizing gas and reducing gas for the conversion of calcium sulfide to calcium oxide while maintaining a substantially constant linear gas velocity based on a free cross-sectional area of the fluidized bed reactor throughout the cycle.

\* \* \* \* \*

UNITED STATES PATENT AND TRADEMARK OFFICE
CERTIFICATE OF CORRECTION

PATENT NO. : 5,653,955
DATED : August 5, 1997
INVENTOR(S) : Thomas D. Wheelock

It is certified that error appears in the above-indentified patent and that said Letters Patent is hereby corrected as shown below:

column 1, line 64, delete "sulfide" and insert --sulfate--.

column 2, line 6, delete "and" and insert --to--.

column 2, line 8, delete "and and insert --to--.

column 2, line 53, delete "testing" and insert --treating--.

column 3, line 44, in equation 7, delete the second occurance of "=" and insert --+--.

column 4, line 24, delete "convening" and insert --converting--.

Table 1, for Experiment No. ORM1, in the last column delete "3:1" and insert --5:1--.

column 12, line 10, delete "28.9" and insert --26.9--.

column 17, line 11, delete "oily" and insert --only--.

column 19, line 1, delete "fluidized" and insert --moving--.

column 19, line 19, delete "claim 17" and insert --claim 16--.

UNITED STATES PATENT AND TRADEMARK OFFICE
CERTIFICATE OF CORRECTION

PATENT NO. : 5,653,955
DATED : August 5, 1997
INVENTOR(S) : Thomas D. Wheelock

It is certified that error appears in the above-indentified patent and that said Letters Patent is hereby corrected as shown below:

column 19, line 19, delete "claim 17" and insert --claim 16--.

Signed and Sealed this

Second Day of December, 1997

Attest:

BRUCE LEHMAN

Attesting Officer

Commissioner of Patents and Trademarks